US012197755B2

(12) United States Patent
Moon

(10) Patent No.: US 12,197,755 B2
(45) Date of Patent: Jan. 14, 2025

(54) STORAGE DEVICE HAVING DEDUPLICATION MANAGER, METHOD OF OPERATING THE SAME, AND METHOD OF OPERATING STORAGE SYSTEM INCLUDING THE SAME

(71) Applicant: Samsung Electronics Co., Ltd., Suwon-si (KR)

(72) Inventor: Dongouk Moon, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 39 days.

(21) Appl. No.: 17/878,395

(22) Filed: Aug. 1, 2022

(65) Prior Publication Data

US 2023/0205443 A1    Jun. 29, 2023

(30) Foreign Application Priority Data

Dec. 24, 2021  (KR) ........................ 10-2021-0187568

(51) Int. Cl.
*G06F 3/06* (2006.01)
(52) U.S. Cl.
CPC .......... *G06F 3/0641* (2013.01); *G06F 3/0608* (2013.01); *G06F 3/0683* (2013.01)
(58) Field of Classification Search
CPC ..... G06F 3/0641; G06F 3/0608; G06F 3/0683
See application file for complete search history.

(56) References Cited

U.S. PATENT DOCUMENTS

| 8,397,080 | B2 | 3/2013 | Lu et al. |
| 8,577,850 | B1 | 11/2013 | Genda et al. |
| 9,141,633 | B1* | 9/2015 | Li .......................... G06F 16/113 |
| 9,792,306 | B1 | 10/2017 | Wartnick |
| 10,073,878 | B1* | 9/2018 | Han ...................... G06F 3/0641 |
| 10,437,682 | B1 | 10/2019 | Jonnala |
| 10,460,774 | B2 | 10/2019 | Lee |
| 10,545,696 | B2 | 1/2020 | Kanteti et al. |
| 2008/0082648 | A1* | 4/2008 | Ahmed ................. H04L 67/568 |
| | | | 709/217 |

(Continued)

FOREIGN PATENT DOCUMENTS

| EP | 2811413 A1 | 12/2014 |
| KR | 101252375 B1 | 4/2013 |
| KR | 101350132 B1 | 1/2014 |

*Primary Examiner* — Baboucarr Faal
(74) *Attorney, Agent, or Firm* — Harness, Dickey & Pierce, P.L.C.

(57) ABSTRACT

Disclosed is a storage device which communicates with a first external storage device and includes a deduplication manager. A method of operating the storage device includes broadcasting, by the deduplication manager, a first fingerprint of first data, receiving a first response corresponding to the first fingerprint from the first external storage device, determining, by the deduplication manager, whether a reference flag of the first response has a first value or a second value, updating, by the deduplication manager, first mapping information of a mapping table based on the first response, based on a determination that the reference flag of the first response has the first value, and performing, by the deduplication manager, deduplication of the first data, based on the first response, based on a determination that the reference flag of the first response has the first value.

20 Claims, 15 Drawing Sheets

(56) References Cited

U.S. PATENT DOCUMENTS

| | | | |
|---|---|---|---|
| 2014/0115258 A1* | 4/2014 | Week | G06F 16/1752 |
| | | | 711/163 |
| 2015/0161000 A1 | 6/2015 | Kim et al. | |
| 2016/0162218 A1* | 6/2016 | Callaway | G06F 3/067 |
| | | | 707/692 |
| 2021/0191880 A1 | 6/2021 | Ki | |

* cited by examiner

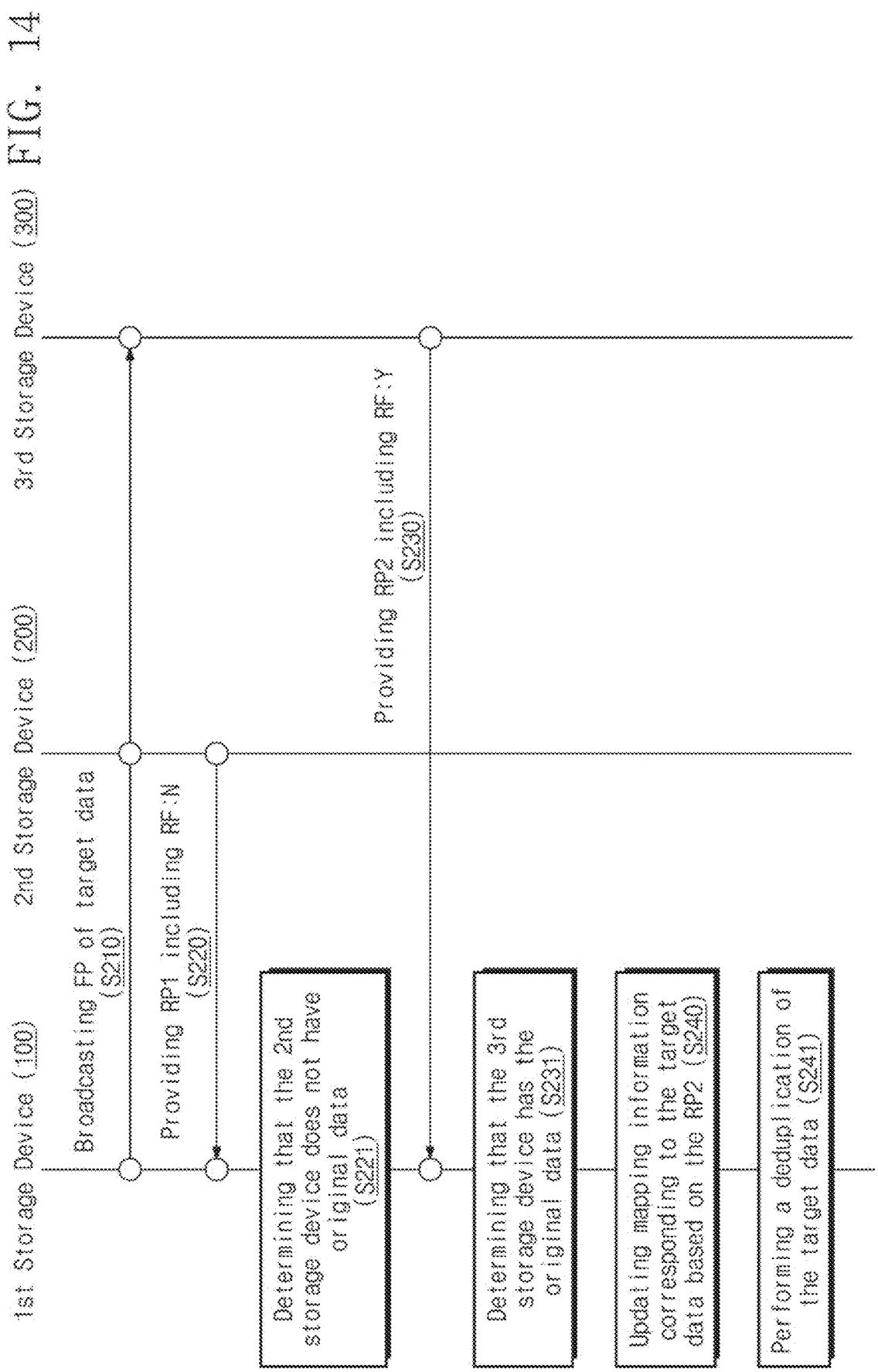

STORAGE DEVICE HAVING DEDUPLICATION MANAGER, METHOD OF OPERATING THE SAME, AND METHOD OF OPERATING STORAGE SYSTEM INCLUDING THE SAME

CROSS-REFERENCE TO RELATED APPLICATIONS

This application claims priority under 35 U.S.C. § 119 to Korean Patent Application No. 10-2021-0187568 filed on Dec. 24, 2021, in the Korean Intellectual Property Office, the disclosures of which are incorporated by reference herein in their entireties.

BACKGROUND

Example embodiments of the present disclosure described herein relate to storage devices, and more particularly, relate to storage devices including a deduplication manager, methods of operating the same, and methods of operating a storage system including the storage device.

A memory device stores data in response to a write request and outputs data stored therein in response to a read request. For example, the memory device is classified as a volatile memory device, which loses data stored therein when a power supply is turned off, such as a dynamic random access memory (DRAM) device or a static RAM (SRAM) device, or a non-volatile memory device, which retains data stored therein even when a power supply is turned off, such as a flash memory device, a phase-change RAM (PRAM), a magnetic RAM (MRAM), or a resistive RAM (RRAM).

The non-volatile memory device may be used as a high-capacity storage device. A storage device may include duplicate data due to various factors such as characteristics of applications and files, a characteristic of a user, data backup, and the like. In example embodiments where a plurality of data expressing the same content, that is, a plurality of duplicate data whose content is the same as that of original data are repeatedly stored multiple times, the capacity of the storage device may be unnecessarily wasted. A deduplication scheme may be used to reduce or prevent the capacity of the storage device from being unnecessarily wasted. According to the deduplication scheme, instead of storing the same data multiple times, only one original data may be stored, and the remaining duplicate data may be managed to refer to the original data. The deduplication scheme may suppress the waste of the capacity of the storage device but may additionally use deduplication-related operations. As such, there it is beneficial to include a scheme to efficiently perform the deduplication.

SUMMARY

Example embodiments of the present disclosure provide a storage device including a deduplication manager, a method of operating the same, and a method of operating a storage system including the same.

According to example embodiments, a storage device communicates with a first external storage device and includes a deduplication manager. A method of operating the storage device includes broadcasting, by the deduplication manager, a first fingerprint of first data, receiving a first response corresponding to the first fingerprint from the first external storage device, determining, by the deduplication manager, whether a reference flag of the first response has a first value or a second value, updating, by the deduplication manager, first mapping information of a mapping table based on the first response, wherein the first mapping information corresponds to the first data, based on a determination that the reference flag of the first response has the first value, and performing, by the deduplication manager, deduplication of the first data, based on the first response, based on a determination that the reference flag of the first response has the first value.

According to example embodiments, a storage system includes a first storage device including a first deduplication manager and a second storage device including a second deduplication manager. A method of operating the storage system includes broadcasting, by the first deduplication manager, a fingerprint of target data, providing, by the second deduplication manager, a first response corresponding to the broadcast fingerprint to the first storage device, determining, by the first deduplication manager, whether a reference flag of the first response has a first value or a second value, mapping information corresponding to the first data and included in a mapping table of the first storage device, based on the first response, based on a determination that the reference flag of the first response has the first value, updating, by the first deduplication manager, and performing, by the first deduplication manager, deduplication of the target data in the first storage device, based on the first response, based on a determination that the reference flag of the first response has the first value.

According to example embodiments, a storage device includes a memory device that stores a plurality of data, a mapping table that manages a plurality of mapping information respectively corresponding to the plurality of data, and a deduplication manager that communicates with an external storage device. The deduplication manager broadcasts a first fingerprint of first data among the plurality of data, receives a first response corresponding to the first fingerprint from the external storage device, determines whether a reference flag of the first response has a first value or a second value, updates first mapping information corresponding to the first data from among the plurality of mapping information of the mapping table and performs deduplication of the first data among the plurality of data in the memory device, based on the first response, based on a determination that the reference flag of the first response has the first value, and updates the first mapping information among the plurality of mapping information of the mapping table and maintain the first data among the plurality of data in the memory device, based on a determination that the reference flag of the first response has the second value.

BRIEF DESCRIPTION OF THE FIGURES

The above and other objects and features of the present disclosure will become apparent by describing in detail example embodiments thereof with reference to the accompanying drawings.

FIG. 14 is a flowchart describing a method of operating a storage system according to some example embodiments of the present disclosure.

DETAILED DESCRIPTION

Below, example embodiments of the present disclosure will be described in detail and clearly to such an extent that one skilled in the art easily carries out the present disclosure.

Figure 1:
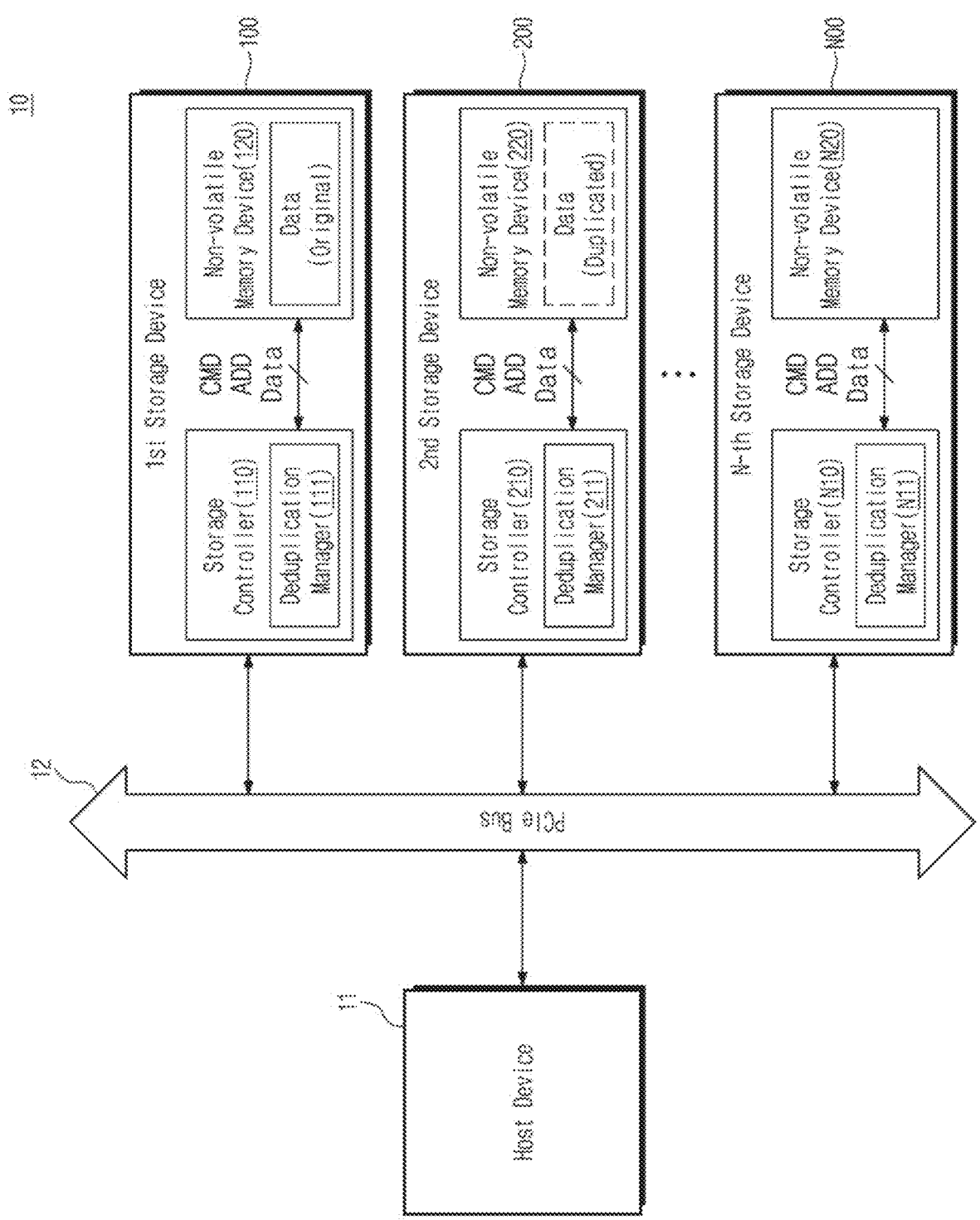
FIG. 1 is a block diagram of a storage system according to example embodiments of the present disclosure.

FIG. 1 is a block diagram of a storage system according to example embodiments of the present disclosure. Referring to FIG. 1, there is illustrated a storage system 10. In some example embodiments, the storage system 10 may include a computing system, which is configured to process a variety of information, such as a data center, a server, a personal computer (PC), a notebook, a laptop, a workstation, a tablet PC, a smartphone, a digital camera, and a black box.

The storage system 10 may include a host device 11, a PCIe (Peripheral Component Interconnect Express) bus 12, and a plurality of storage devices 100 to N00. For example, the plurality of storage devices 100 to N00 may be also referred to as "first to N-th storage devices 100 to N00". Herein, "N" is a natural number.

The host device 11 may control overall operations of the storage system 10. For example, the host device 11 may communicate with the plurality of storage devices 100 to N00 through the PCIe bus 12. The host device 11 may store data in the plurality of storage devices 100 to N00 or may read data stored in the plurality of storage devices 100 to N00.

The PCIe bus 12 may provide an interface for communication between the host device 11 and the plurality of storage devices 100 to N00. For example, through the PCIe bus 12, the host device 11 may read data stored in the plurality of storage devices 100 to N00 or may write data in the plurality of storage devices 100 to N00. Through the PCIe bus 12, the plurality of storage devices 100 to N00 may communicate with each other in a peer-to-peer (P2P) manner.

Each of the plurality of storage devices 100 to N00 may store data received from the host device 11 or may provide the stored data to the host device 11. The plurality of storage devices 100 to N00 may communicate with each other.

The first storage device 100 may include a storage controller 110 and a non-volatile memory device 120.

The non-volatile memory device 120 may store data. The storage controller 110 may store data in the non-volatile memory device 120 or may read data stored in the non-volatile memory device 120. The non-volatile memory device 120 may operate under control of the storage controller 110. For example, based on a command CMD indicating an operation and an address ADD indicating a location of data, the storage controller 110 may store the data in the non-volatile memory device 120 or may read the data stored in the non-volatile memory device 120.

In some example embodiments, the non-volatile memory device 120 may be a NAND flash memory device, but the present disclosure is not limited thereto. For example, the non-volatile memory device 120 may be one of various storage devices, which retain data stored therein even though a power is turned off, such as a phase-change random access memory (PRAM), a magnetic random access memory (MRAM), a resistive random access memory (RRAM), and a ferroelectric random access memory (FRAM).

The storage controller 110 may include a deduplication manager 111. The deduplication manager 111 may be a device or module that manages duplicate data. The storage system 10 may include duplicate data whose content is the same as that of original data, due to characteristics of applications and files, a characteristic of a user, data backup, and the like. In example embodiments where a plurality of data expressing the same content, that is, a plurality of duplicate data whose content is the same as that of the original data are repeatedly stored multiple times, the storage capacity may be unnecessarily wasted.

The deduplication manager 111 may perform deduplication on duplicate data whose content is the same as that of original data. According to the deduplication scheme, instead of storing the same data multiple times, only one original data may be stored, and the remaining duplicate data may be managed to refer to the original data. For example, when the deduplication operation is performed on duplicate data, the duplicate data stored in a non-volatile memory device may be deleted, or the duplicate data temporarily stored in a volatile memory (e.g., a write buffer memory) may be discarded. Because a storage capacity is further secured through the deduplication as much as the size of duplicate data, the storage system 10 in which the efficiency of the storage capacity is improved may be provided.

The deduplication manager 111 of the storage device 100 (hereinafter referred to as a "first storage device 100") may communicate with a deduplication manager of another storage device (hereinafter referred to as a "second storage device") (e.g., 200 in FIG. 1) in the P2P manner. For example, the deduplication manager 111 of the first storage device 100 and a deduplication manager 211 of the second storage device may communicate with each other in the P2P manner in compliance with various standards such as CMP (Controller Memory Buffer) and PMR (Persistent Memory Region) of NVMe (Non-volatile Memory express), CXL (Compute Express Link), or CCIX (Cache Coherent Interconnect for Accelerators).

As the deduplication manager 111 communicates with the deduplication manager of the second storage device in the P2P manner, the deduplication manager 111 may remove the same duplicate data as original data stored in the second storage device or may make it possible to refer to the duplicate data stored in the second storage device.

For example, when the non-volatile memory device 120 of the first storage device 100 stores original data and a non-volatile memory device 220 of the second storage device 200 stores duplicate data, the deduplication manager 211 of the second storage device 200 may broadcast a fingerprint indicating a unique characteristic of the duplicate data to the PCIe bus 12. The deduplication manager 111 of the first storage device 100 may provide a response indicating that there is original data whose fingerprint is the same as the broadcast fingerprint, to the deduplication manager 211 of the second storage device 200. The deduplication manager 211 of the second storage device 200 may perform deduplication on the duplicate data and may manage the duplicate data such that the duplicate data refer to original data of the first storage device 100.

The plurality of storage devices 100 to N00 may have similar structures. For example, the second storage device 200 may include the storage controller 210 and the non-volatile memory device 220. A storage controller 210 may include the deduplication manager 211. The N-th storage device N00 may include a storage controller N10 and a non-volatile memory device N20. The storage controller N10 may include a deduplication manager N11. Functions and structures of the second to N-th storage devices 200 to N00 may be similar to the function and structure of the first storage device 100.

As described above, according to example embodiments of the present disclosure, a storage device that performs deduplication through the P2P-based communication may be provided. In general, deduplication may be performed by a host device. For example, the host device may extract a fingerprint of each of a plurality of data and may manage a fingerprint of data, an address of the data, whether to perform deduplication on the data, and the like through a separate table. The above operations of the host device may cause the reduction of performance of a storage system due to an increase in a computational amount of the host device and a bottleneck in a memory of the host device.

In some example embodiments of the present disclosure, as the plurality of storage devices 100 to N00 perform deduplication through the deduplication managers 111 to N11 automatically (e.g., without the intervention of the host device 11), there may be provided the storage system 10 in which the input/output (I/O) load between the plurality of storage devices 100 to N00 and the host device 11 decreases, a computational load of the host device 11 decreases, a data processing speed is improved, and a storage capacity is efficiently used. A storage system in which a storage device automatically performs deduplication will be described in detail with reference to FIGS. 4 and 5.

Figure 2:
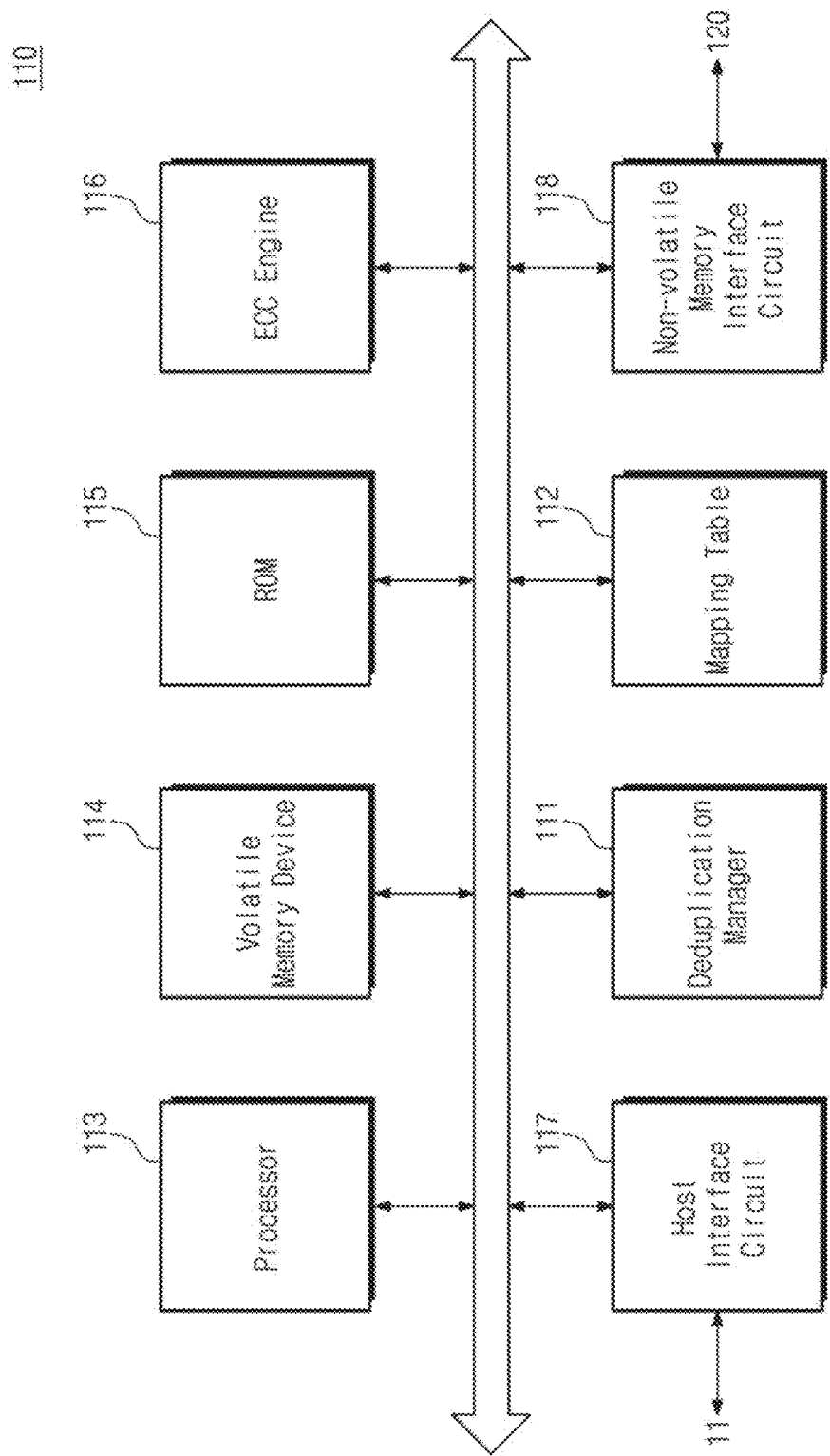
FIG. 2 is a block diagram illustrating a storage controller of FIG. 1 in detail, according to some example embodiments of the present disclosure.

FIG. 2 is a block diagram illustrating a storage controller of FIG. 1 in detail, according to some example embodiments of the present disclosure. Referring to FIGS. 1 and 2, the first storage device 100 may include the storage controller 110 and the non-volatile memory device 120. The storage controller 110 may communicate with the host device 11 and any other storage devices through the PCIe bus 12. The storage controller 110 may communicate with the non-volatile memory device 120.

The storage controller 110 may include the deduplication manager 111, a mapping table 112, a processor 113, a volatile memory device 114, a read only memory (ROM) 115, an error correcting code (ECC) engine 116, a host interface circuit 117, and a non-volatile memory interface circuit 118. The deduplication manager 111 is similar to the deduplication manager 111 of FIG. 1, and thus, additional description will be omitted to avoid redundancy.

The mapping table 112 may communicate with the deduplication manager 111. The mapping table 112 may manage mapping information of data. For example, the mapping table 112 may manage mapping information of data stored in the non-volatile memory device 120 or mapping information of data temporarily stored in the volatile memory device 114 after received from the host device 11. The mapping information may include an address of data, a fingerprint of the data, whether to perform deduplication on the data, and the like. The mapping table 112 will be described in detail with reference to FIGS. 6 and 7 together.

In some example embodiments, the deduplication manager 111 and the mapping table 112 may be implemented in the form of hardware, software, or a combination thereof. For example, at least a part of the deduplication manager 111 and the mapping table 112 may be included in the storage controller 110 in the form of a separate circuit, device, or chip. Alternatively, at least a part of the deduplication manager 111 and the mapping table 112 may be implemented by a software module that is stored in the non-volatile memory device 120 in the form of instructions and are loaded to the volatile memory device 114 by the processor 113.

The processor 113 may control an overall operation of the storage controller 110. The volatile memory device 114 may be used as a write buffer memory, a read buffer memory, a cache memory, or a working memory of the storage controller 110. For example, the volatile memory device 114 may be implemented with a static random access memory (SRAM) or a dynamic random access memory (DRAM). In some example embodiments, the deduplication manager 111 loaded to the volatile memory device 114 may perform deduplication on target data. The ROM 115 may be used as a read only memory that stores information necessary for the operation of the storage controller 110. For example, the ROM 115 may be uses as a portion of a firmware memory.

The ECC engine 116 may detect and correct an error of data read from the non-volatile memory device 120. For example, the ECC engine 116 may have an error correction capability of a given level. The ECC engine 116 may correct an error of data not exceeding the error correction capability and may process data having an error level (e.g., the number of flipped bits) exceeding the error correction capability as an uncorrectable error.

The storage controller 110 may communicate with the host device 11 through the host interface circuit 117. The host interface circuit 117 may provide a host interface layer (HIL). In some example embodiments, the host interface circuit 117 may be implemented based on at least one of various interfaces such as a serial ATA (SATA) interface, a peripheral component interconnect express (PCIe) interface, a serial attached SCSI (SAS), a nonvolatile memory express (NVMe) interface, and a universal flash storage (UFS) interface.

The storage controller 110 may communicate with the non-volatile memory device 120 through the non-volatile memory interface circuit 118. In some example embodiments, the non-volatile memory interface circuit 118 may be implemented based on a NAND interface.

The storage controller 110 of the first storage device 100 is described with reference to FIG. 2. However, the present disclosure is not limited thereto. For example, each of the storage controllers 210 to N10 of the second to N-th storage devices 200 to N00 may be similar in structure to the storage controller 110 of the first storage device 100.

Figure 3:
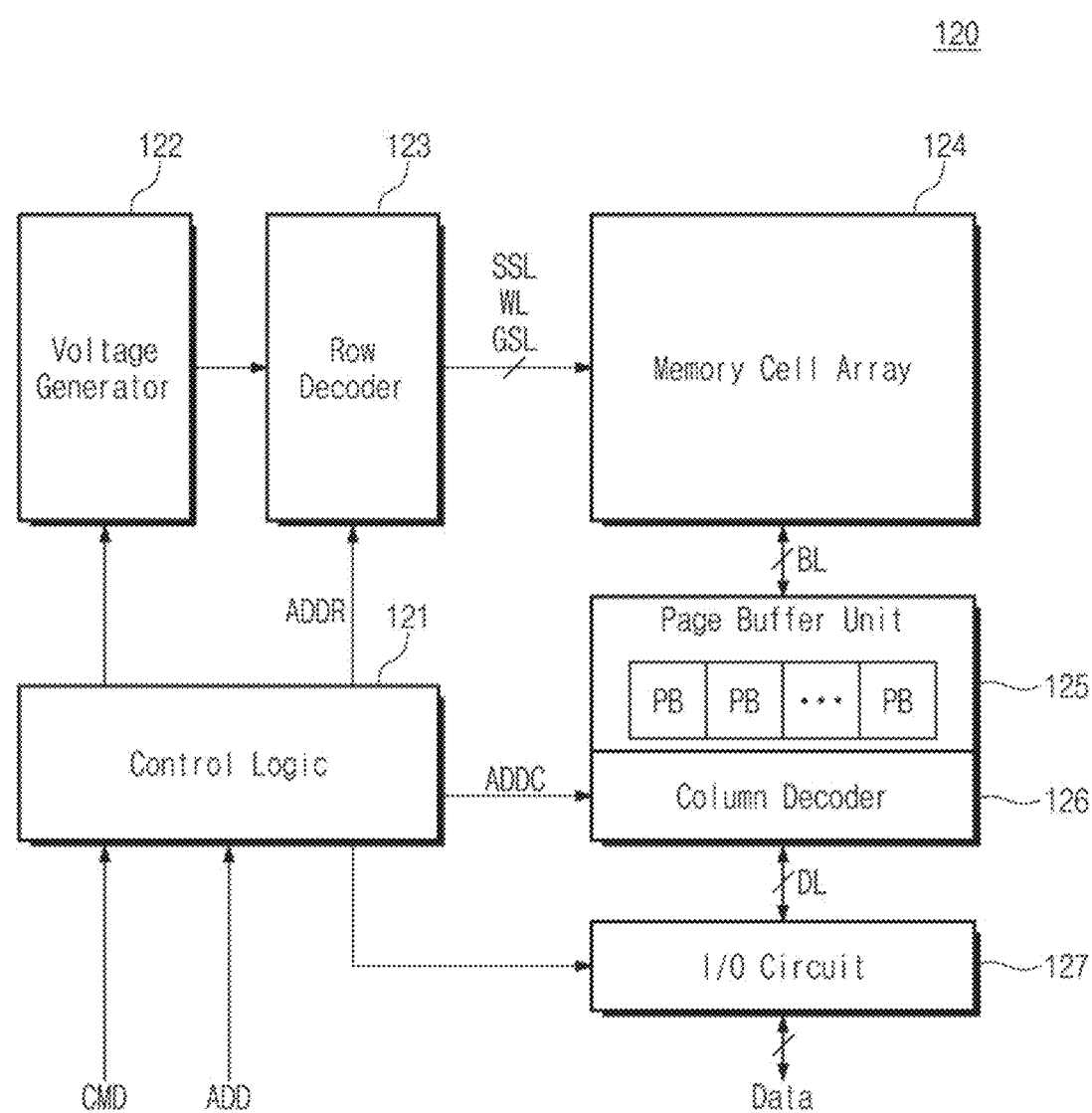
FIG. 3 is a block diagram illustrating a non-volatile memory device of FIG. 1 in detail, according to some example embodiments of the present disclosure.

FIG. 3 is a block diagram illustrating a non-volatile memory device of FIG. 1 in detail, according to some example embodiments of the present disclosure. Referring to FIGS. 1 and 3, the non-volatile memory device 120 may communicate with the storage controller 110. For example, the non-volatile memory device 120 may receive the address ADD and the command CMD from the storage controller 110. The non-volatile memory device 120 may exchange data with the storage controller 110.

The non-volatile memory device 120 may include control logic 121, a voltage generator 122, a row decoder 123, a memory cell array 124, a page buffer unit 125, a column decoder 126, and an input/output (I/O) circuit 127. The data (e.g., original data or duplicate data) described with reference to FIG. 1 may be stored in the memory cell array 124.

The control logic 121 may receive the command CMD and the address ADD from the storage controller 110. The command CMD may refer to a signal indicating an operation to be performed by the non-volatile memory device 120, such as a read operation, a write operation, or an erase operation. The address ADD may include a row address ADDR and a column address ADDC. The control logic 121 may generate the row address ADDR and the column address ADDC based on the address ADD.

Under control of the control logic 121, the voltage generator 122 may control voltages to be applied to the memory cell array 124 through the row decoder 123.

The row decoder 123 may receive the row address ADDR from the control logic 121. The row decoder 123 may be connected with the memory cell array 124 through string selection lines SSL, word lines WL, and ground selection lines GSL. The row decoder 123 may decode the row address ADDR and may control voltages to be applied to the string selection lines SSL, the word lines WL, and the ground selection lines GSL based on a decoding result and a voltage(s) received from the voltage generator 122.

The memory cell array 124 may include a plurality of memory cells. Each of the memory cells may have a threshold voltage level corresponding to at least a portion of data. The memory cells may be arranged in a row direction and a column direction. Some of the memory cells may correspond to the data (e.g., original data or duplicate data) of FIG. 1.

In some example embodiments, the memory cell array 124 may include a plurality of memory blocks. A memory block may correspond to a physical erase unit of the non-volatile memory device 120, but the present disclosure is not limited thereto. For example, the physical erase unit may be changed to a page unit, a word line unit, a sub-block unit, or the like.

The page buffer unit 125 may include a plurality of page buffers PB. The page buffer unit 125 may be connected with the memory cell array 124 through the bit lines BL. The page buffer unit 125 may read data from the memory cell array 124 in units of page, by sensing voltages of the bit lines BL.

The column decoder 126 may receive the column address ADDC from the control logic 121. The column decoder 126 may decode the column address ADDC and may provide the data read by the page buffer unit 125 to the I/O circuit 127 based on a decoding result.

The column decoder 126 may receive data from the I/O circuit 127 through data lines DL. The column decoder 126 may receive the column address ADDC from the control logic 121. The column decoder 126 may decode the column address ADDC and may provide the data received from the I/O circuit 127 to the page buffer unit 125 based on a decoding result. The page buffer unit 125 may store the data provided from the I/O circuit 127 in the memory cell array 124 through the bit lines BL in units of page.

The I/O circuit 127 may be connected with the column decoder 126 through the data lines DL. The I/O circuit 127 may provide data received from the storage controller 110 to the column decoder 126 through the data lines DL. The I/O circuit 127 may output data received through the data lines DL to the storage controller 110.

The non-volatile memory device 120 of the first storage device 100 is described with reference to FIG. 3. However, the present disclosure is not limited thereto. For example, each of the non-volatile memory device 220 to N20 of the second to N-th storage devices 200 to N00 may be similar in structure to the non-volatile memory device 120 of the first storage device 100.

Figure 4:
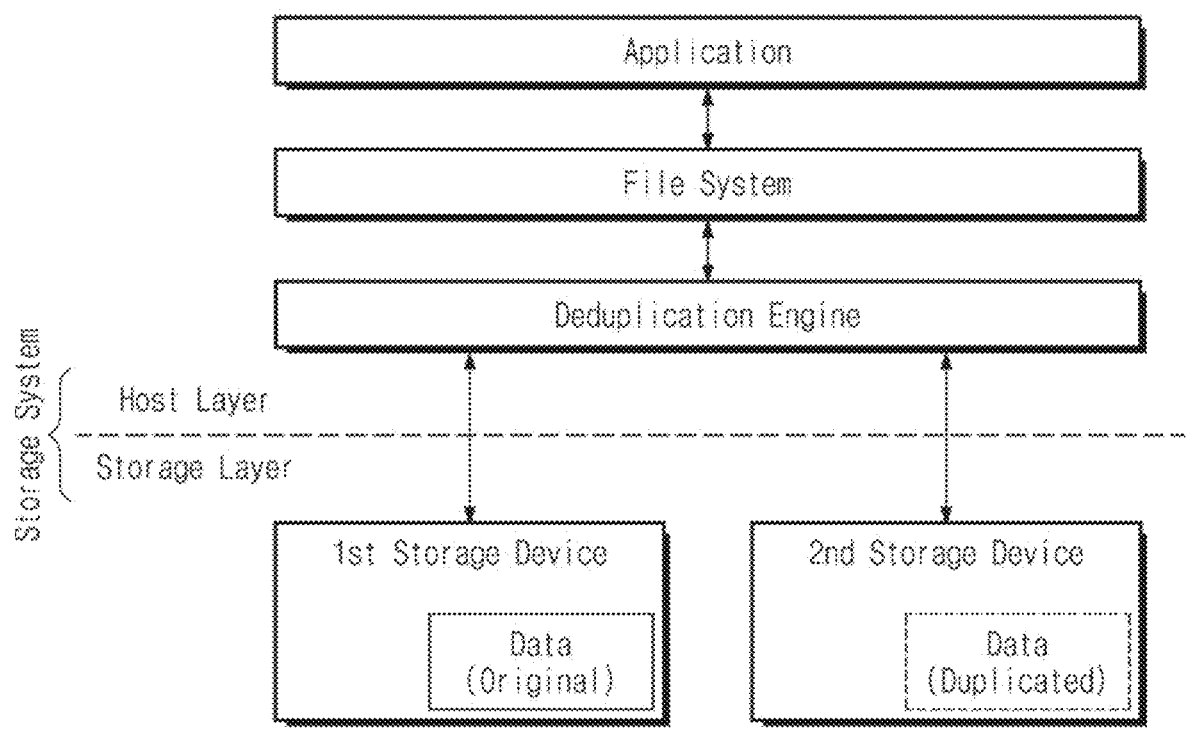
FIG. 4 is a diagram describing a deduplication operation of a conventional storage system.

FIG. 4 is a diagram describing a deduplication operation of a conventional storage system. A conventional storage system that performs deduplication will be described with reference to FIG. 4. The conventional storage system may include a host layer and a storage layer.

The host layer may include an application, a file system, and a deduplication engine.

The application may refer to a software program designed to perform a specific function. For example, the application may include a word processor, a database program, a web browser, an image editing program, and the like. The application may communicate with the user of the storage system through a user interface device such as a touchscreen, a monitor, a mouse, a keyboard, a microphone, or a speaker.

The file system manages files. The file system may manage the following operations depending on an operation of an operating system or a request of an application executed by the operating system: operations of creating a file, accessing a file, opening a file, changing a file, and removing a file. A file may be a set of data. A set of data corresponding to a file may be stored in the storage layer.

Under control of the file system, the deduplication engine may manage the deduplication operation for a plurality of data stored in the storage layer.

The storage layer may include a first storage device and a second storage device. Data stored in the first storage device may be original data. Data stored in the second storage device may be duplicate data. A fingerprint of the original data may coincide with a fingerprint of the duplicate data. A point in time when the duplicate data are stored may be later than a point in time when the original data are stored.

The deduplication engine may communicate with the storage layer to manage the duplicate data. For example, the deduplication engine may communicate with the first storage device and the second storage device of the storage layer. The deduplication engine may generate a fingerprint from the original data, may generate a fingerprint from the duplicate data, may perform deduplication on the duplicate data whose fingerprint coincides with the fingerprint of the original data, and may manage mapping information such that the deduplicated duplicate data refers to the original data.

According to the conventional storage system, the deduplication engine of the host layer may fetch the original data and the duplicate data from the storage layer. When the fingerprint of the fetched original data coincides with the fingerprint of the fetched duplicate data, the deduplication engine may request the storage layer to erase the duplicate data.

As the deduplication is performed, I/O operations between the storage layer and the host layer may be accomplished, a computation load in the host layer may increase, the bottleneck may occur due to the processing of original data and duplicate data in a host memory of the host layer. This may mean that the performance of the storage system is reduced. To reduce or prevent the above issues, there is required a deduplication technique for decreasing the load of the host layer.

Figure 5:
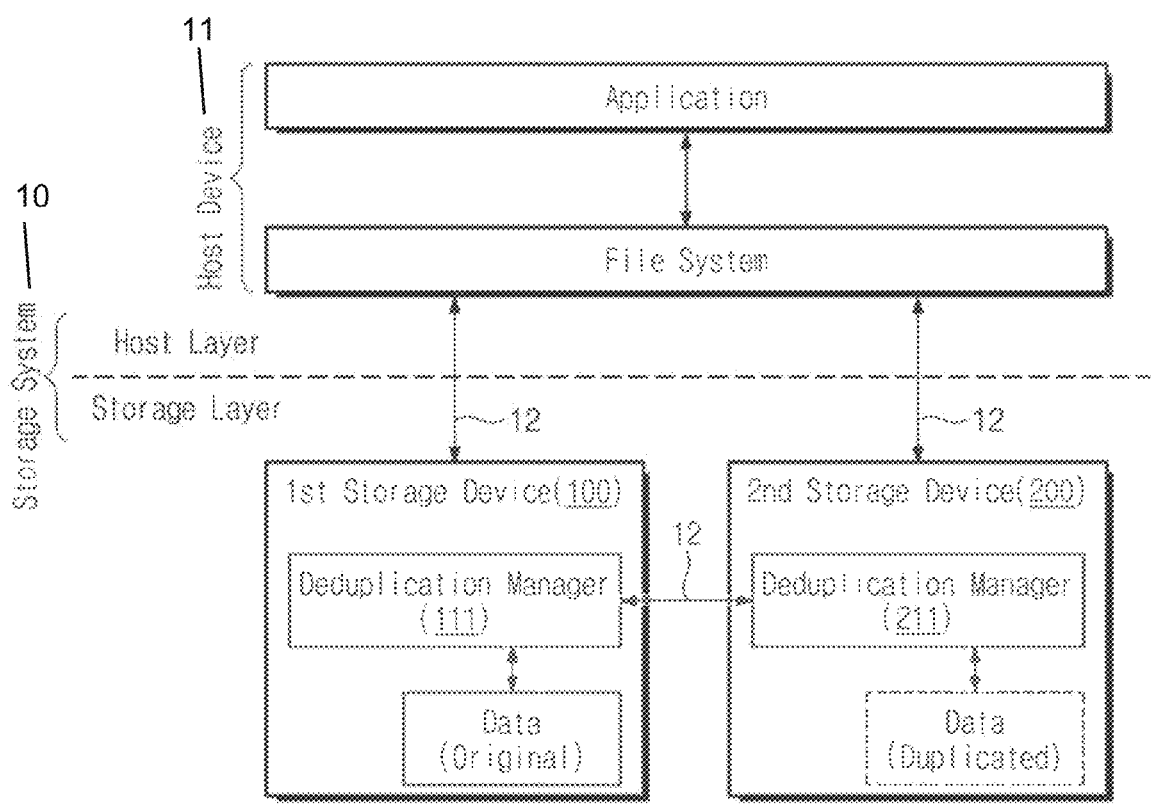
FIG. 5 is a diagram describing a deduplication operation of a storage system according to some example embodiments of the present disclosure.

FIG. 5 is a diagram describing a deduplication operation of a storage system according to some example embodiments of the present disclosure. How the storage system 10 according to example embodiments of the present disclosure performs deduplication will be described with reference to FIG. 5. The storage system 10 may correspond to the storage system 10 of FIG. 1.

The storage system 10 may include a host layer and a storage layer. The host layer may include the host device 11. The host device 11 may include an application and a file system. The application and the file system may respectively correspond to the application and the file system of FIG. 4.

According to some example embodiments of the present disclosure, the file system may communicate with the storage layer. For example, the file system may communicate with the first storage device 100 and the second storage device 200 through the PCIe bus 12. The file system may store data in the first and second storage devices 100 and 200 or may read data stored in the first and second storage devices 100 and 200.

The storage layer may include the first storage device 100 and the second storage device 200. The first storage device 100 may include the deduplication manager 111. The deduplication manager 111 may manage deduplication of data stored in the first storage device 100. The second storage device 200 may include the deduplication manager 211. The deduplication manager 211 may manage deduplication of data stored in the second storage device 200.

According to some example embodiments of the present disclosure, the first and second storage devices 100 and 200 may perform deduplication. The deduplication manager 111 of the first storage device 100 and the deduplication manager 211 of the second storage device 200 may communicate with each other through the PCIe bus 12. That is, the PCIe bus 12 may provide an interface between the first and second storage devices 100 and 200 within the storage layer. Through the P2P-based communication with another storage device, each of the deduplication managers 111 and 211 may determine whether original data are present in the other storage device and may perform deduplication of the duplicate data.

For example, the first storage device 100 may store original data. The second storage device 200 may store duplicate data. The deduplication manager 211 of the second storage device 200 may obtain a fingerprint of the duplicate data and may broadcast the fingerprint to the first storage device 100 through the PCIe bus 12. The deduplication manager 111 of the first storage device 100 may determine whether the fingerprint broadcast from the second storage device 200 coincides with a fingerprint of the original data and may provide, through the PCIe bus 12, the second storage device 200 with a response providing notification that the original data are present. The deduplication manager 211 of the second storage device 200 may perform deduplication on the duplicate data based on the response received from the first storage device 100 and may perform management such that the duplicate data refer to the original data of the first storage device 100.

As described above, according to example embodiments of the present disclosure, the storage system 10 may automatically perform deduplication in the storage layer without the intervention of the host device 11. Accordingly, I/O operations between the storage layer and the host layer may be omitted, a computation load in the host layer for the deduplication operation may decrease, the bottleneck may not occur due to the processing of original data and duplicate data in a host memory of the host layer. This may mean that the performance of the storage system 10 is improved.

Figure 6:
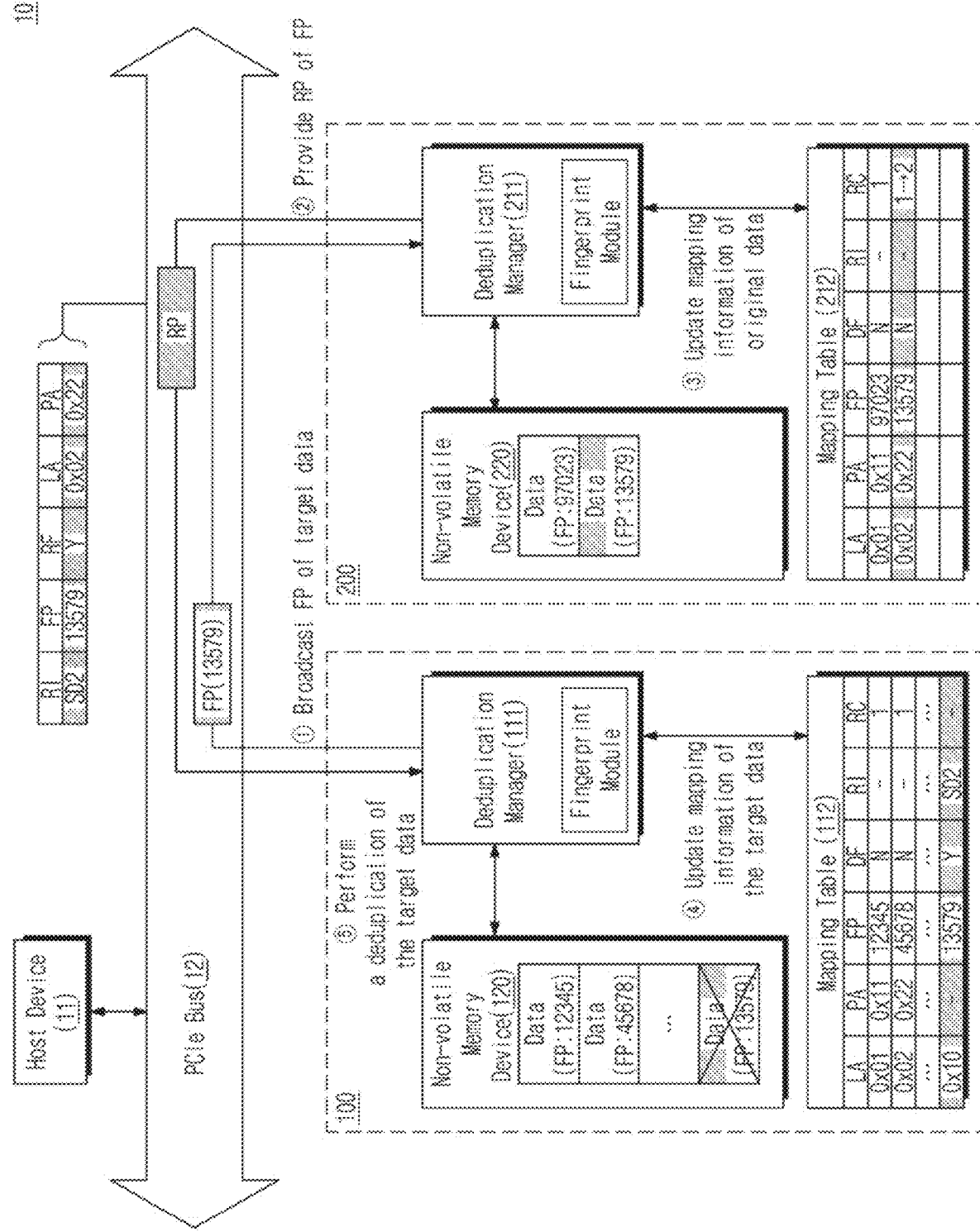
FIG. 6 is a diagram describing a method of operating a storage system according to some example embodiments of the present disclosure.

FIG. 6 is a diagram describing a method of operating a storage system according to some example embodiments of the present disclosure. The storage system 10 according to some example embodiments of the present disclosure will be described with reference to FIG. 6. The storage system 10 may correspond to the storage system 10 of FIGS. 1 and 5.

The storage system 10 may include the host device 11, the PCIe bus 12, the first storage device 100, and the second storage device 200.

Through the PCIe bus 12, the host device 11 may store data in the first and second storage devices 100 and 200, may read data stored in the first and second storage devices 100 and 200, or may erase the data stored in the first and second storage devices 100 and 200.

The PCIe bus 12 may provide an interface between the host device 11, the first storage device 100, and the second storage device 200.

The first storage device 100 may include the deduplication manager 111, the mapping table 112, and the non-volatile memory device 120. The deduplication manager 111 may communicate with the deduplication manager 211 of the second storage device 200. The deduplication manager 111 may manage the deduplication operation of data stored in the non-volatile memory device 120 with reference to the mapping table 112. The deduplication manager 111 may include a fingerprint module. The fingerprint module may manage a fingerprint corresponding to data. The mapping table 112 may manage mapping information about each of a plurality of data stored in the non-volatile memory device 120. The non-volatile memory device 120 may store a plurality of data.

The second storage device 200 may include the deduplication manager 211, a mapping table 212, and the non-volatile memory device 220. The deduplication manager 211 may communicate with the deduplication manager 111 of the first storage device 100. The deduplication manager 211 may manage the deduplication operation of data stored in the non-volatile memory device 220 with reference to the mapping table 212. The deduplication manager 211 may include a fingerprint module. The mapping table 212 may manage mapping information about each of a plurality of data stored in the non-volatile memory device 220. The non-volatile memory device 220 may store a plurality of data.

Below, a method in which the storage system 10 according to some example embodiments of the present disclosure performs deduplication will be described.

In a first operation ①, the deduplication manager 111 of the first storage device 100 may broadcast a fingerprint FP of target data. The target data may be one of the plurality of data stored in the non-volatile memory device 120, or may be data temporarily stored in the volatile memory device (e.g., a write buffer memory) of the first storage device 100 after received from the host device 11.

The deduplication manager 111 may obtain the fingerprint FP of the target data through the fingerprint module. For example, the fingerprint FP of the target data may be "13579". The fingerprint FP may indicate a unique characteristic of data corresponding to the fingerprint FP. When fingerprints of two different data coincide with each other, the two different data may include the same content. When fingerprints of two different data do not coincide with each other, the two different data may indicate different content.

The deduplication manager 111 may broadcast the fingerprint FP of the target data through the PCIe bus 12. To reduce or prevent a drawing from being complicated, example embodiments in which the fingerprint FP of the target data is transferred only to the second storage device 200 are illustrated. However, when the storage system 10 further includes another storage device (e.g., a third storage device), the fingerprint FP may also be broadcast to the other storage device (e.g., a third storage device) in the storage system 10.

The deduplication operation of the deduplication manager 111 may be automatically triggered by the first storage device 100 or may be triggered by a deduplication request from the host device 11. How the deduplication operation is triggered will be described in detail with reference to FIG. 9 together.

In a second operation ②, the deduplication manager 211 of the second storage device 200 may provide the first storage device 100 with a response RP corresponding to the fingerprint FP broadcast in the first operation ①.

In detail, the deduplication manager 211 of the second storage device 200 may receive the fingerprint FP broadcast from the first storage device 100 through the PCIe bus 12. The broadcast fingerprint FP may be "13579".

Original data having the fingerprint FP of "13579" may be present in the non-volatile memory device 220 of the second storage device 200. A fingerprint of original data may be stored in the mapping table 212. The mapping table 212 may manage mapping information about each of a plurality of data stored in the non-volatile memory device 220.

The mapping information may include a logical address LA, a physical address PA, the fingerprint FP, a duplicate flag DF, a reference index RI, and a reference count RC. The logical address LA that is an address indicating a location of data may refer to an address capable of being identified by the host device 11 and by an external device such as the first storage device 100. The physical address PA that is an address having a logical-to-physical mapping relationship with the logical address LA may refer to an address that is internally used in the first/second storage device 100/200. The fingerprint FP may indicate a unique characteristic of data.

The duplicate flag DF may indicate whether data are original data or duplicate data. For example, when a value of the duplicate flag DF is a first value "Y", data corresponding to the duplicate flag DF may be duplicate data. When the value of the duplicate flag DF is a second value "N", the data corresponding to the duplicate flag DF may be original data.

The reference index RI may indicate identification information of a storage device in which original data to be referenced are stored. In detail, when a value of the duplicate flag DF is the first value "Y", the reference index RI may indicate identification information of a storage device in which there are stored original data which the deduplicated duplicate data refer to. When a value of the duplicate flag DF is the second value "N", an entry of the mapping table 112 corresponding to the reference index RI may be empty.

The reference count RC may indicate the number of times that data are referenced. In detail, when a value of the duplicate flag DF is the first value "Y", an entry of the mapping table 112 corresponding to the reference count RC may be empty. When the value of the duplicate flag DF is the second value "N", the reference count RC may indicate the number of times that data corresponding to original data are referenced. The number of times that data are referenced may include the number of times that data are referenced by itself. For example, when the reference count RC is "1", only original data may exist. When the reference count RC is "2", original data and one duplicate data may exist.

With reference to the mapping table 212, the deduplication manager 211 may determine that there is mapping information corresponding to the fingerprint FP broadcast through the PCIe bus 12. The deduplication manager 211 may provide the first storage device 100 with the response RP, which indicates that there is mapping information having a fingerprint of target data, through the PCIe bus 12 based on determining that the mapping information exists.

The response RP may include a first field including the reference index RI, a second field including the fingerprint FP, a third field including the reference flag RF indicating that there is mapping information corresponding to the fingerprint FP, a fourth field including a logical address LA of original data, and a fifth field including a physical address PA of the original data.

The reference index RI of the first field may indicate identification information of a storage device that provides the response RP. For example, the identification information of the response RP that the deduplication manager 211 provides may be "SD2". The identification information of "SD2" may correspond to the second storage device 200. Unlike the example embodiments illustrated in FIG. 6, in example embodiments where the deduplication manager 111 of the first storage device 100 provides a response, the identification information may be "SD1". In other words, the identification information may relate to an identifier of the storage location or device that provides the response RP.

The fingerprint FP of the second field may indicate a unique characteristic of target data corresponding to the response RP. For example, the response RP may have a correspondence relationship with the broadcast fingerprint FP. When the fingerprint FP broadcast in the first operation ① is "13579", the fingerprint FP included in the response RP provided in the second operation ② may be "13579".

The reference flag RF of the third field may indicate whether original data having the broadcast fingerprint exist. For example, in example embodiments where original data having the fingerprint FP of "13579" are present in the second storage device 200, the reference flag RF may have the first value "Y". In example embodiments where original data having the fingerprint FP of "13579" are absent from the second storage device 200, the reference flag RF may have the second value "N".

The logical address LA of the fourth field may indicate a logical address of original data. The physical address PA of the fifth field may indicate a physical address of original data.

For example, when the reference flag RF of the third field has the first value "Y", the fourth field of the response RP may include "0x02" being a value of the logical address LA of the original data. The fifth field of the response RP may include "0x22" being a value of the physical address PA of original data. As another example, when the reference flag RF of the third field has the second value "N", the fourth field and the fifth field of the response RP may be empty.

In a third operation ③, the deduplication manager 211 may update mapping information of the original data included in the mapping table 212. For example, in the mapping table 212, the reference count RC of the original data having the fingerprint FP of "13579" may be "1". That the reference count RC is "1" may mean that the original data are referenced by itself. The deduplication manager 211 may determine that there are original data having a fingerprint broadcast in the second operation ②. Because the original data having the fingerprint FP of "13579" are further referenced by the first storage device 100, the deduplication manager 211 may update the reference count RC of the mapping table 212, that is, may change the reference count RC from "1" to "2".

For better understanding, the second operation ② and the third operation ③ are described as independent operations, but the present disclosure is not intended to limit a time order of the second operation ② and the third operation ③. The third operation ③ may be performed after the second operation ② is completed. In some other example embodiments, the third operation ③ may be performed together with an operation of referring to the mapping table 212 in the second operation ②.

In a fourth operation ④, the deduplication manager 111 may update mapping information of the target data based on the response RP received through the second operation ②. For example, the reference flag RF of the response RP may have the first value "Y", and the reference index RI may indicate "SD2" being the identification information of the second storage device 200.

The deduplication manager 111 may determine the target data to be duplicate data, based on the response RP received through the second operation ②. The deduplication manager 111 may update the mapping table 112, that is, the mapping information of the target data having the fingerprint FP of "13579" such that a value of the logical address LA is set to "0x10", a value of the physical address PA is empty, a value of the fingerprint FP is set to "13579", a value of the duplicate flag DF is set to the first value "Y", and the reference index RI is set to "SD2" corresponding to the second storage device 200.

In some example embodiments, the deduplication manager 111 may update the mapping information of the target data determined to be duplicate data such that a value of the logical address LA of the original data is stored as a value of the physical address PA. For example, instead of emptying a value of the physical address PA, the deduplication manager 111 may store "0x02" being a value of the logical address LA of the original data as a value of the physical address PA based on the response RP received through the second operation ②.

In a fifth operation ⑤, the deduplication manager 111 may perform deduplication of the target data based on the response RP received through the second operation ②. For example, the reference flag RF of the response RP may have the first value "Y". The deduplication manager 111 may erase the target data having the fingerprint FP of "13579" stored in the non-volatile memory device 120, based on the response RP including the reference flag RF of the first value "Y".

Alternatively, unlike the example embodiments illustrated in FIG. 6, the target data may be data temporarily stored in a volatile memory device of the first storage device 100. The deduplication manager 111 may determine the target data temporarily stored in the volatile memory device to be the duplicate data, based on the response RP including the reference flag RF of the first value "Y" and may discard the duplicate data.

Figure 7:
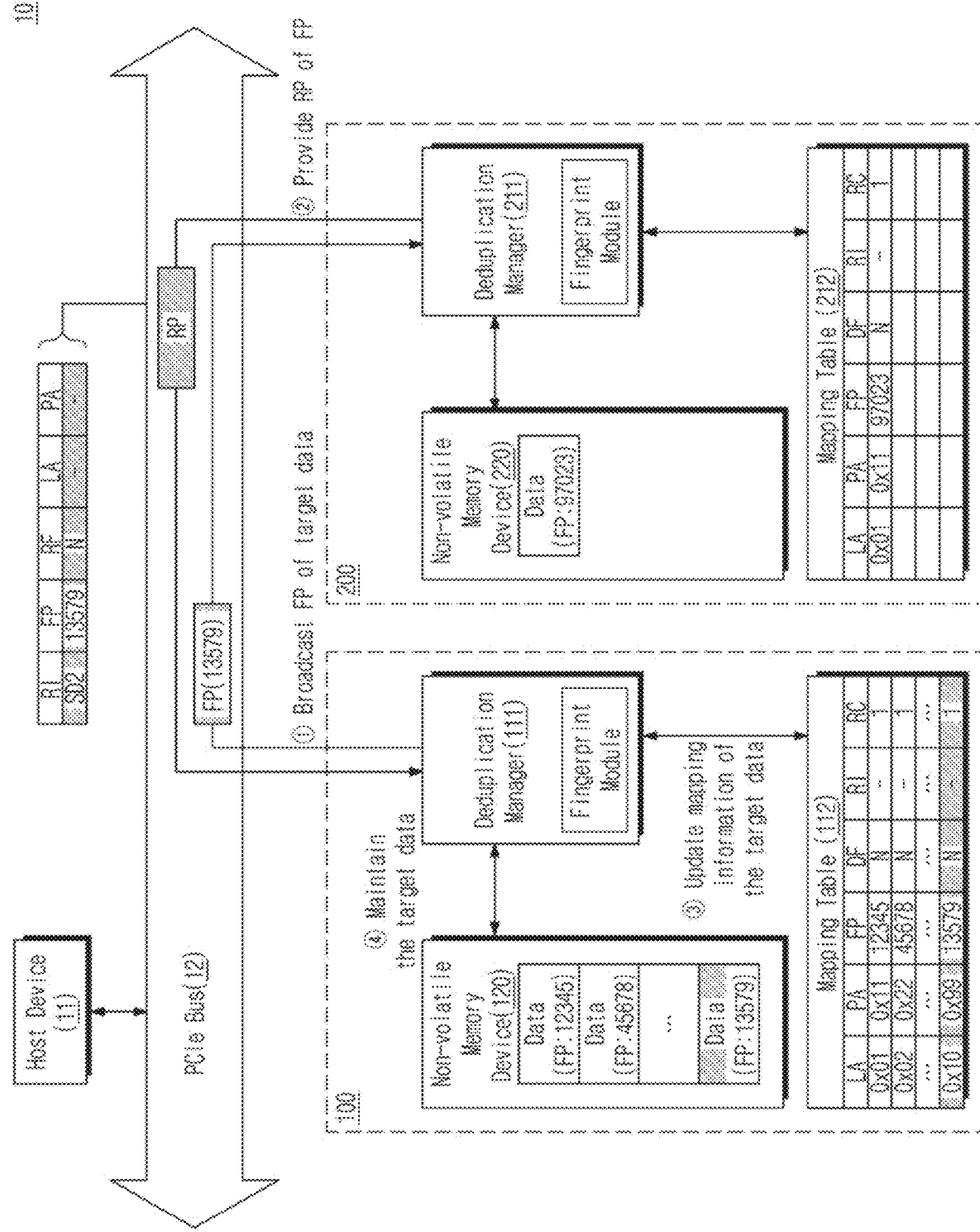
FIG. 7 is a diagram describing a method of operating a storage system according to some example embodiments of the present disclosure.

FIG. 7 is a diagram describing a method of operating a storage system according to some example embodiments of the present disclosure. The storage system 10 according to some example embodiments of the present disclosure will be described with reference to FIG. 7. The storage system 10 may correspond to the storage system 10 of FIGS. 1, 5, and 6.

The storage system 10 may include the host device 11, the PCIe bus 12, the first storage device 100, and the second storage device 200. The first storage device 100 may include the deduplication manager 111, the mapping table 112, and the non-volatile memory device 120. The second storage device 200 may include the deduplication manager 211, the mapping table 212, and the non-volatile memory device 220.

Characteristics of the host device 11, the PCIe bus 12, the first storage device 100, and the second storage device 200 are similar to the characteristics of the host device 11, the PCIe bus 12, the first storage device 100, and the second storage device 200, and thus, additional description will be omitted to avoid redundancy.

Below, a method in which the storage system 10 according to some example embodiments of the present disclosure performs deduplication will be described.

In a first operation ①, the deduplication manager 111 of the first storage device 100 may broadcast a fingerprint FP of target data. For example, the fingerprint FP of the target data may be "13579".

In a second operation ②, the deduplication manager 211 of the second storage device 200 may provide the first storage device 100 with the response RP corresponding to the fingerprint FP broadcast in the first operation ①.

For example, the deduplication manager 211 of the second storage device 200 may receive the fingerprint FP broadcast from the first storage device 100 through the PCIe bus 12. The broadcast fingerprint FP may be "13579". Original data having the fingerprint FP of "13579" may be absent from the non-volatile memory device 220 of the second storage device 200. Whether original data exist may be managed by the mapping table 212.

With reference to the mapping table 212, the deduplication manager 211 may determine that there is no mapping information corresponding to the fingerprint FP broadcast through the PCIe bus 12. The deduplication manager 211 may provide the first storage device 100 with the response RP, which indicates that there is no mapping information having a fingerprint of target data, through the PCIe bus 12 based on determining that the mapping information does not exist.

The response RP may include a first field including the reference index RI, a second field including the fingerprint FP, a third field including the reference flag RF indicating whether there is mapping information corresponding to the fingerprint FP, a fourth field including a logical address LA of original data, and a fifth field including a physical address PA of the original data. Because the original data having the fingerprint FP of "13579" are absent from the second storage device 200, the reference flag RF may have the second value "N".

In a third operation ③, the deduplication manager 111 may update mapping information of the target data based on the response RP received through the second operation ②. For example, the reference flag RF of the response RP may have the second value "N".

The deduplication manager 111 may determine the target data to be original data, based on the response RP received through the second operation ②. The deduplication manager 111 may update mapping information of the target data in the mapping table 112 such that a value of the duplicate flag DF of the mapping information of the target data having the fingerprint FP of "13579" is set to the second value "N". Alternatively, the deduplication manager 111 may register the mapping information of the original data at the mapping table 112 for the first time.

In a fourth operation ④, the deduplication manager 111 may maintain the target data based on the response RP received through the second operation ②. For example, the reference flag RF of the response RP may have the second value "N". Also, the deduplication manager 111 may ignore (or may not receive) any other response having a reference flag of the first value "Y" from any other storage device.

The deduplication manager 111 may maintain the target data having the fingerprint FP of "13579" stored in the non-volatile memory device 120, based on that the response RP corresponding to the broadcast fingerprint FP and including the reference flag RF of the first value "Y" are not received during a given time.

Alternatively, unlike the example embodiments illustrated in FIG. 7, the target data may be data temporarily stored in a volatile memory device of the first storage device 100. The deduplication manager 111 may move the target data temporarily stored in the volatile memory device to the non-volatile memory device 120, based on that the response RP corresponding to the broadcast fingerprint FP and including the reference flag RF of the first value "Y" are not received during the given time.

Figure 8:
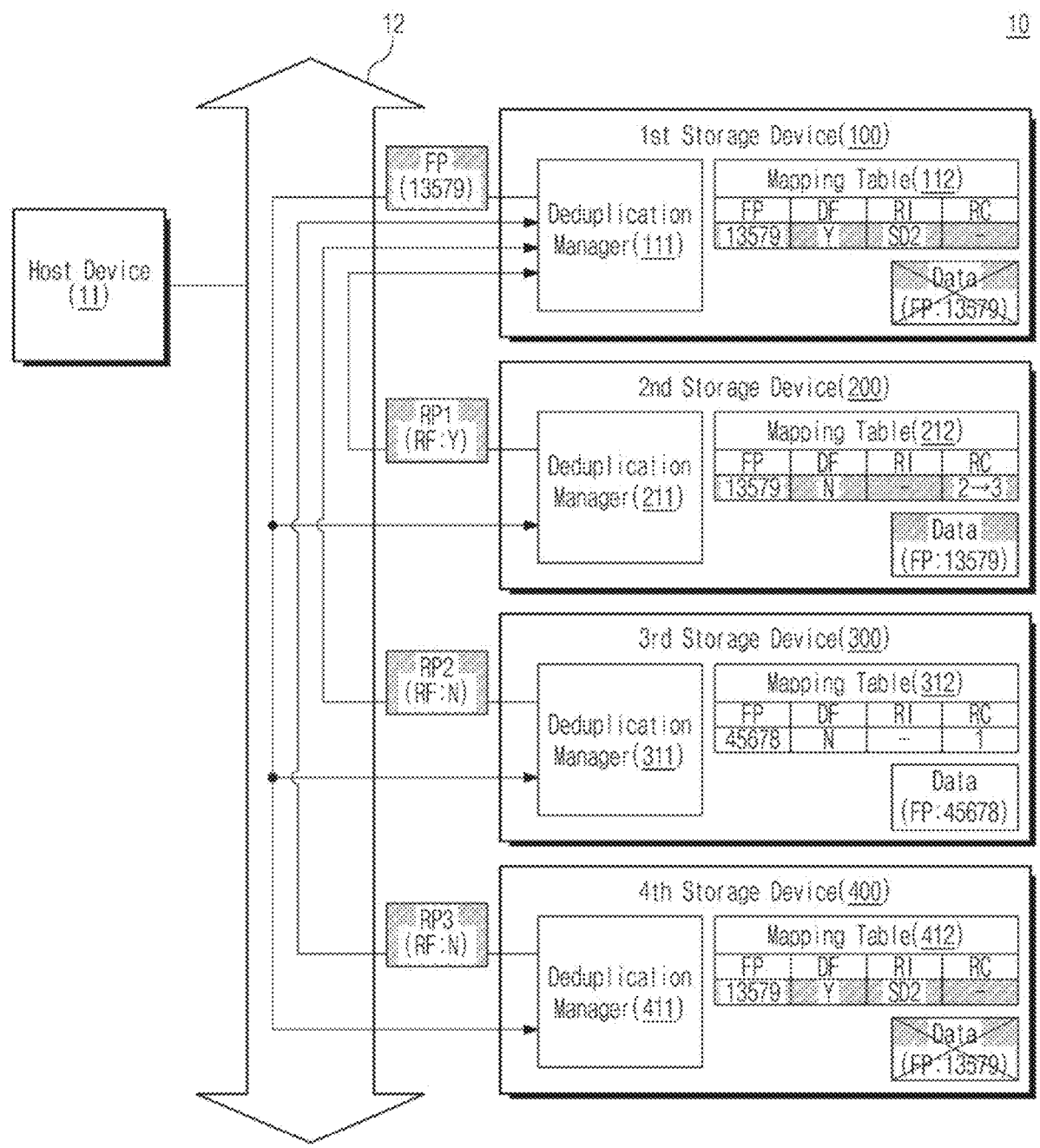
FIG. 8 is a diagram describing a storage system including a plurality of storage devices according to some example embodiments of the present disclosure.

FIG. 8 is a diagram describing a storage system including a plurality of storage devices according to some example embodiments of the present disclosure. Referring to FIG. 8, the storage system 10 may include first to fourth storage devices 100 to 400.

The storage system 10 may include the host device 11, the PCIe bus 12, and the first to fourth storage devices 100 to 400. The first storage device 100 may include the deduplication manager 111 and the mapping table 112. The first storage device 100 may store data. As in the above description, the second, third, and fourth storage devices 200, 300, and 400 may respectively include deduplication managers 211, 311, and 411, may respectively include mapping tables 212, 312, and 412, and may store data.

The first storage device 100 may start deduplication of target data having the fingerprint FP of "13579". The first storage device 100 may broadcast the fingerprint FP of "13579" to the PCIe bus 12. The fingerprint FP broadcast to the PCIe bus 12 may be transferred to any other storage devices connected with the PCIe bus 12.

The second storage device 200 may receive the broadcast fingerprint FP. The second storage device 200 may include original data having the fingerprint FP of "13579". With reference to the mapping table 212, the deduplication manager 211 may determine that the original data having the fingerprint FP of "13579" exist. The deduplication manager 211 may provide a first response RP1 including the reference flag RF having the first value "Y" to the first storage device 100 through the PCIe bus 12.

The deduplication manager 211 may update the mapping table 212 such that the reference count RC of mapping information of the original data increases from "2" to "3". That the reference count RC is "3" may mean that original data and two duplicate data having the same fingerprint exist.

The third storage device 300 may receive the broadcast fingerprint FP. Original data having the fingerprint FP of "13579" may be absent from the third storage device 300. With reference to the mapping table 312, the deduplication manager 311 may determine that the original data having the fingerprint FP of "13579" do not exist. The deduplication manager 311 may provide a second response RP2 including the reference flag RF having the second value "N" to the first storage device 100 through the PCIe bus 12.

The fourth storage device 400 may receive the broadcast fingerprint FP. Original data having the fingerprint FP of "13579" may be absent from the fourth storage device 400. For example, in the fourth storage device 400, data having the fingerprint FP of "13579" may be deduplicated duplicate data, not original data. With reference to the mapping table 412, the deduplication manager 411 may determine that the original data having the fingerprint FP of "13579" do not exist. The deduplication manager 411 may provide a third response RP3 including the reference flag RF having the second value "N" to the first storage device 100 through the PCIe bus 12.

The first storage device 100 may receive at least one response from any other storage devices connected through the PCIe bus 12. For example, the first storage device 100 may receive the first to third responses RP1 to RP3. The reference flag RF of the first response RP1 may have the first value "Y". The reference flag RF of each of the second and third responses RP2 and RP3 may have the second value "N".

When a response including the reference flag RF having the first value "Y" is present in the responses received from any other storage devices, the first storage device 100 may perform deduplication of the target data. For example, when the first response RP1 including the reference flag RF having the first value "Y" is present in the first to third responses RP1 to RP3, the first storage device 100 may perform deduplication of the target data.

As another example, unlike the example embodiments illustrated in FIG. 8, when a response including the reference flag RF having the first value "Y" is absent from the responses received from any other storage devices, the first storage device 100 may maintain the target data. In detail, based on that a response including the reference flag RF having the first value "Y" is not received during the given time, the first storage device 100 may determine the target data to be original data and may maintain the target data.

That is, when even one response including the reference flag RF having the first value "Y" is present in the responses corresponding to the broadcast fingerprint, the first storage device 100 may perform deduplication of the target data. In some other example embodiments, when each of the responses corresponding to the broadcast fingerprint includes the reference flag RF having the second value "N", the first storage device 100 may determine the target data to be original data.

In some example embodiments, as the number of storage devices included in the storage system 10 increases, a deduplication hit ratio may increase. The deduplication hit ratio may indicate the degree to which target data are deduplicated as a fingerprint of the target data coincides with that of original data. An increase in the deduplication hit ratio may mean that efficiency of a storage capacity is improved.

As data to be managed increase in proportion to an increase in the number of storage devices in the storage system 10, the probability that the same data are duplicated may increase. Even though the number of storage devices increases, a storage device may easily check whether target data are duplicated in any other storage devices, by broadcasting a fingerprint. That is, in the storage system 10, as the number of storage devices increases, efficiency of a storage capacity may be improved.

Figure 9:
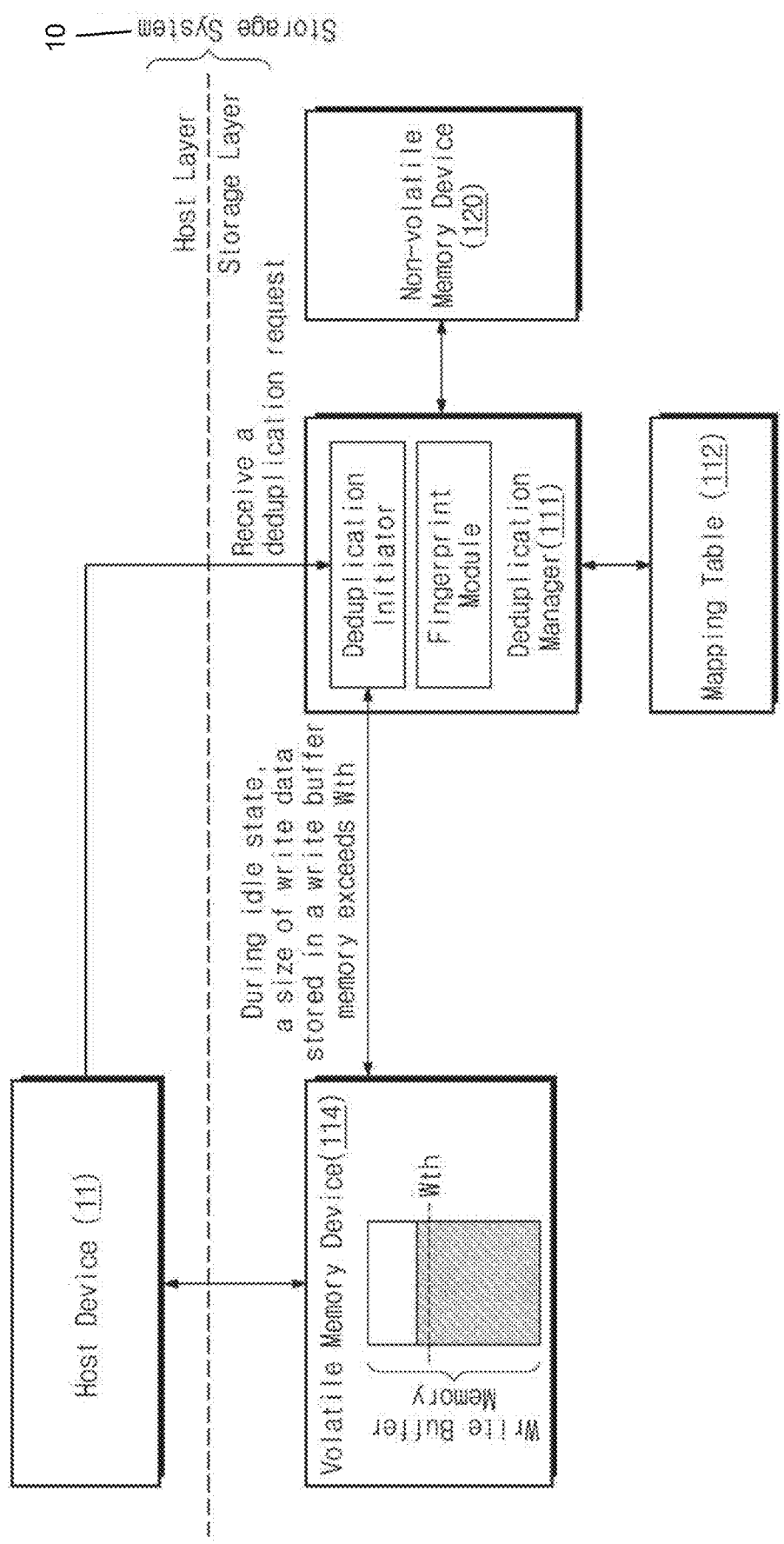
FIG. 9 is a diagram describing a deduplication manager according to some example embodiments of the present disclosure.

FIG. 9 is a diagram describing a deduplication manager according to some example embodiments of the present disclosure. An operation in which the storage system 10 initiates deduplication will be described with reference to FIG. 9. The storage system 10 may include a host layer and a storage layer.

The host layer may include the host device 11. The storage layer may include the deduplication manager 111, the mapping table 112, the volatile memory device 114, and the non-volatile memory device 120. The deduplication manager 111 may include a deduplication initiator and a fingerprint module. The deduplication initiator may trigger the deduplication operation such that the deduplication manager 111 initiates the deduplication operation of target data.

In some example embodiments, the deduplication initiator may trigger the deduplication operation in an on-the-fly manner. For example, the deduplication initiator may receive a deduplication request from the host device 11. The deduplication initiator may immediately trigger the deduplication operation of target data in response to the deduplication request. The deduplication manager 111 may broadcast a fingerprint of the target data to any other (or the remaining) storage devices in response to the trigger of the deduplication initiator.

In some example embodiments, the deduplication initiator may trigger the deduplication operation in a background manner. For example, the deduplication initiator may communicate with the volatile memory device 114. The volatile memory device 114 may include a write buffer memory. The write buffer memory may refer to a memory that temporarily stores write data received from the host device 11. The write buffer memory may have a storage capacity of a given size.

While the storage layer is in an idle state, the deduplication initiator may determine whether the size of the write data stored in the write buffer memory exceeds a write threshold value. The write threshold value may have a size that is used as a criterion of the deduplication operation. When it is determined that the size of the write data stored in the write buffer memory exceeds the write threshold value, the deduplication initiator may trigger the deduplication operation of the target data. The deduplication manager 111 may broadcast a fingerprint of the target data to any other (or the remaining) storage devices in response to the trigger of the deduplication initiator.

Figure 10:
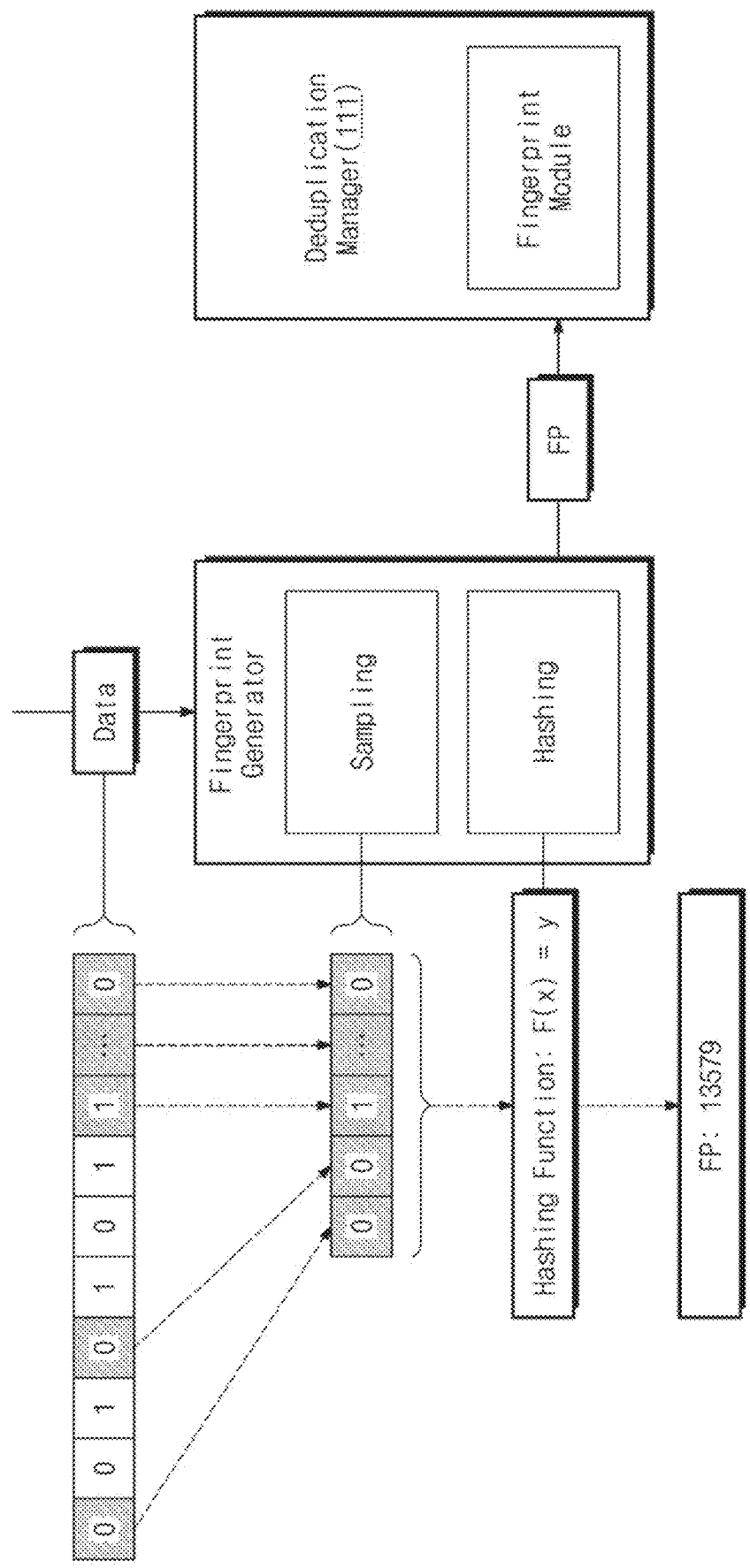
FIG. 10 is a diagram describing a fingerprint generator according to some example embodiments of the present disclosure.

FIG. 10 is a diagram describing a fingerprint generator according to some example embodiments of the present disclosure. A method in which a storage system generates the fingerprint FP of target data will be described with reference to FIG. 10.

The storage system may include a fingerprint generator and the deduplication manager 111. The deduplication manager 111 may include a fingerprint module. The fingerprint module may receive the fingerprint FP from the fingerprint generator. The fingerprint module may broadcast the fingerprint FP to any other storage devices.

The fingerprint generator may receive data. The data may be target data targeted for deduplication. The target data may include a set of plural bits. The fingerprint generator may sample some of the set of plural bits included in the target data. The fingerprint generator may generate the fingerprint FP of the target data by applying the sampled bits to a hashing function. The hashing function may refer to a function of generating an index corresponding to a key-value based on a hashing algorithm. For example, a value of the fingerprint FP obtained by the hashing function may be "13579". The fingerprint generator may provide the fingerprint FP to the deduplication manager 111.

In some example embodiments, the fingerprint generator may be included in a host device. For example, the host device may store target data targeted for deduplication in a cache memory. The fingerprint generator of the host device may generate the fingerprint FP corresponding to the target data based on the communication with the cache memory. The host device may provide the fingerprint FP to the deduplication manager 111 of a storage device. The deduplication manager 111 may broadcast the fingerprint FP to any other storage devices.

In some example embodiments, the fingerprint generator may be included in a storage device. For example, the storage device may include a volatile memory device in which the target data are stored or a non-volatile memory device in which the target data are stored. The fingerprint generator of the storage device may generate the fingerprint FP corresponding to the target data based on the communication with the volatile memory device or the non-volatile memory device. The fingerprint generator may provide the fingerprint FP to the deduplication manager 111. The deduplication manager 111 may broadcast the fingerprint FP to any other storage devices.

Figure 11A:
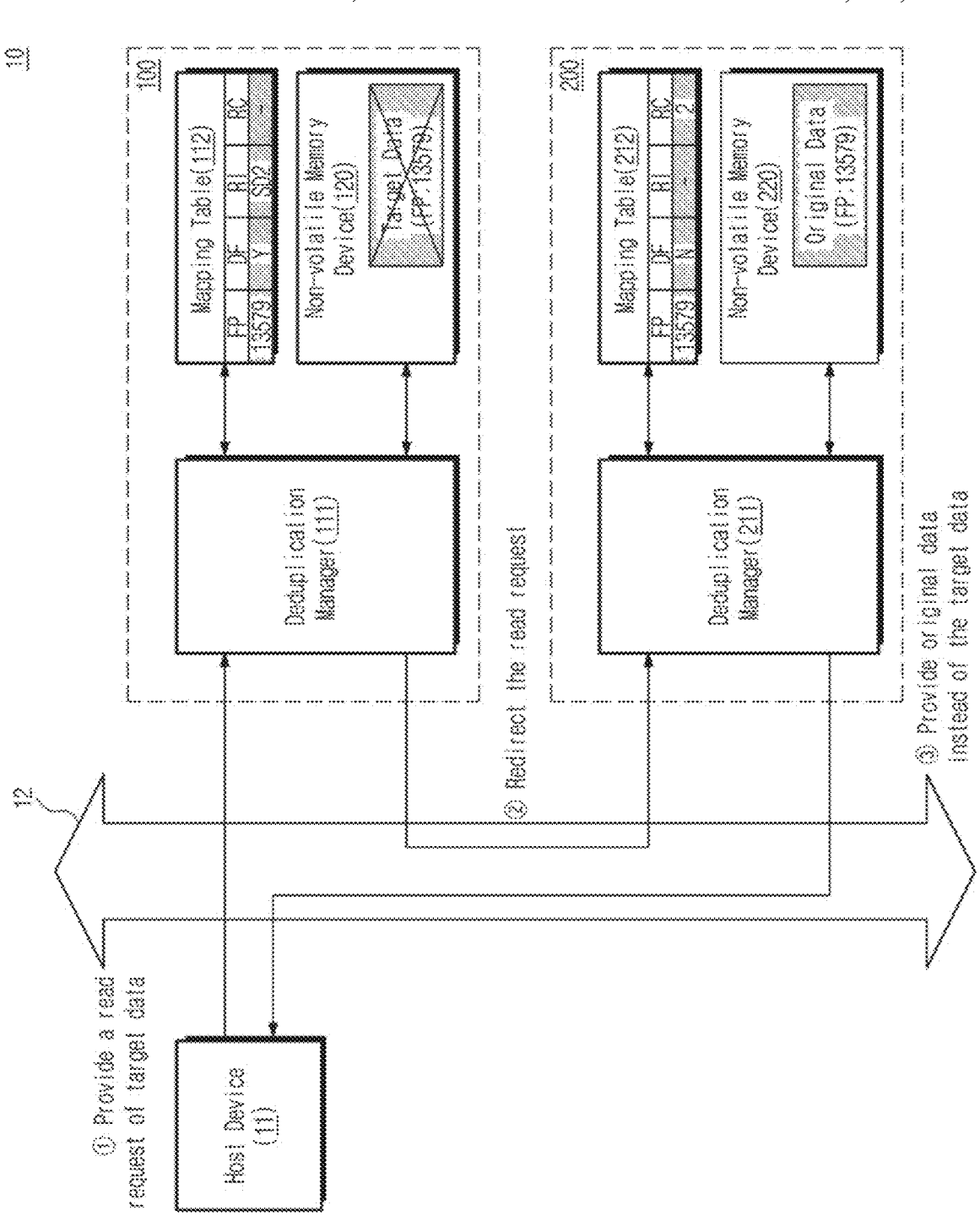
FIG. 11A is a diagram describing a read operation of a storage system according to some example embodiments of the present disclosure.

FIG. 11A is a diagram describing a read operation of a storage system according to some example embodiments of the present disclosure. A redirection-based read operation according to some example embodiments of the present disclosure will be described with reference to FIG. 11A. The storage system 10 may include the host device 11, the PCIe bus 12, the first storage device 100, and the second storage device 200. The first storage device 100 may include the deduplication manager 111, the mapping table 112, and the non-volatile memory device 120. The second storage device 200 may include the deduplication manager 211, the mapping table 212, and the non-volatile memory device 220.

Below, a redirection-based read operation of the storage system 10 according to some example embodiments of the present disclosure will be described.

In a first operation ①, the host device 11 may provide a read request for target data to the first storage device 100 through the PCIe bus 12. The target data may be target data targeted for deduplication. That is, the first storage device 100 may store only mapping information of the target data without storing the target data itself.

In a second operation ②, the deduplication manager 111 may redirect the read request received through the first operation ① to the second storage device 200. For example, the deduplication manager 111 may check that the target data are duplicate data referring to original data of the second storage device 200 with reference to the mapping information of the target data in the mapping table 112. The deduplication manager 111 may redirect the read request to the second storage device 200 based on the checked mapping information.

In a third operation ③, the deduplication manager 211 may provide not the target data but the original data to the host device 11 through the PCIe bus 12, based on the read request redirected through the second operation ②. The original data may be data that are referenced by the target data and include the same content as the target data.

Figure 11B:
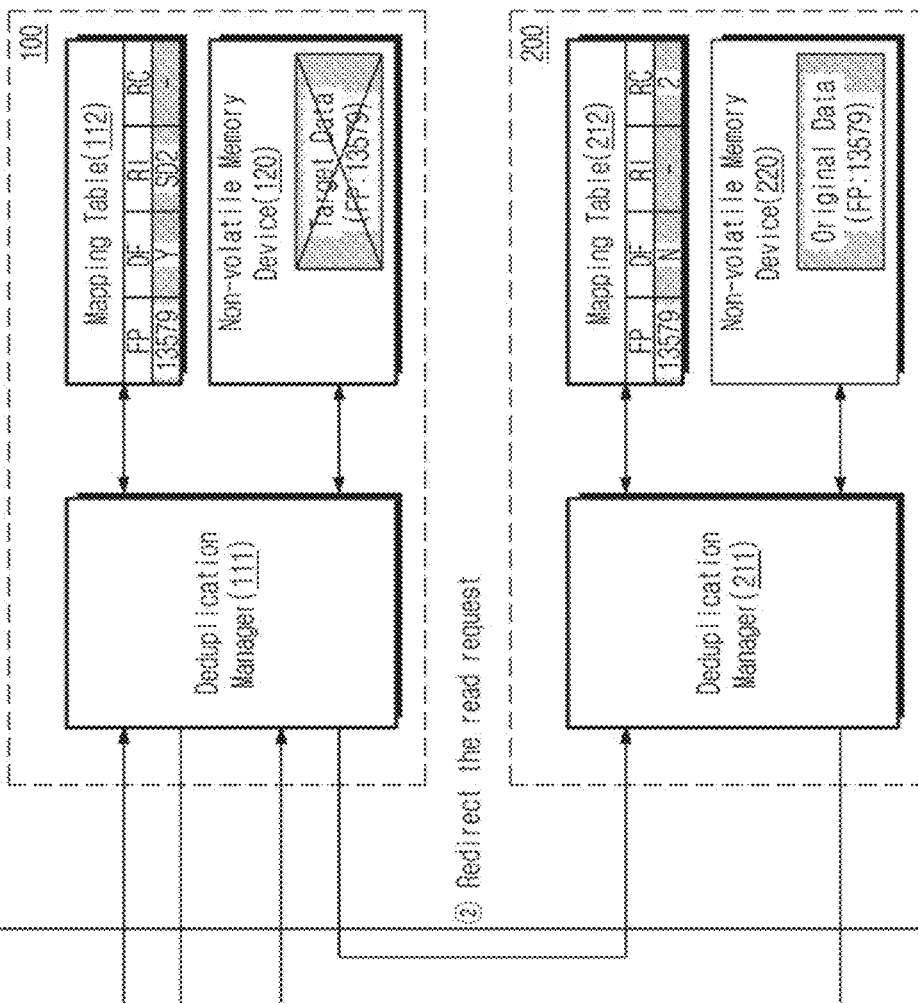
FIG. 11B is a diagram describing a read operation of a storage system according to some example embodiments of the present disclosure.
Figure 11B:
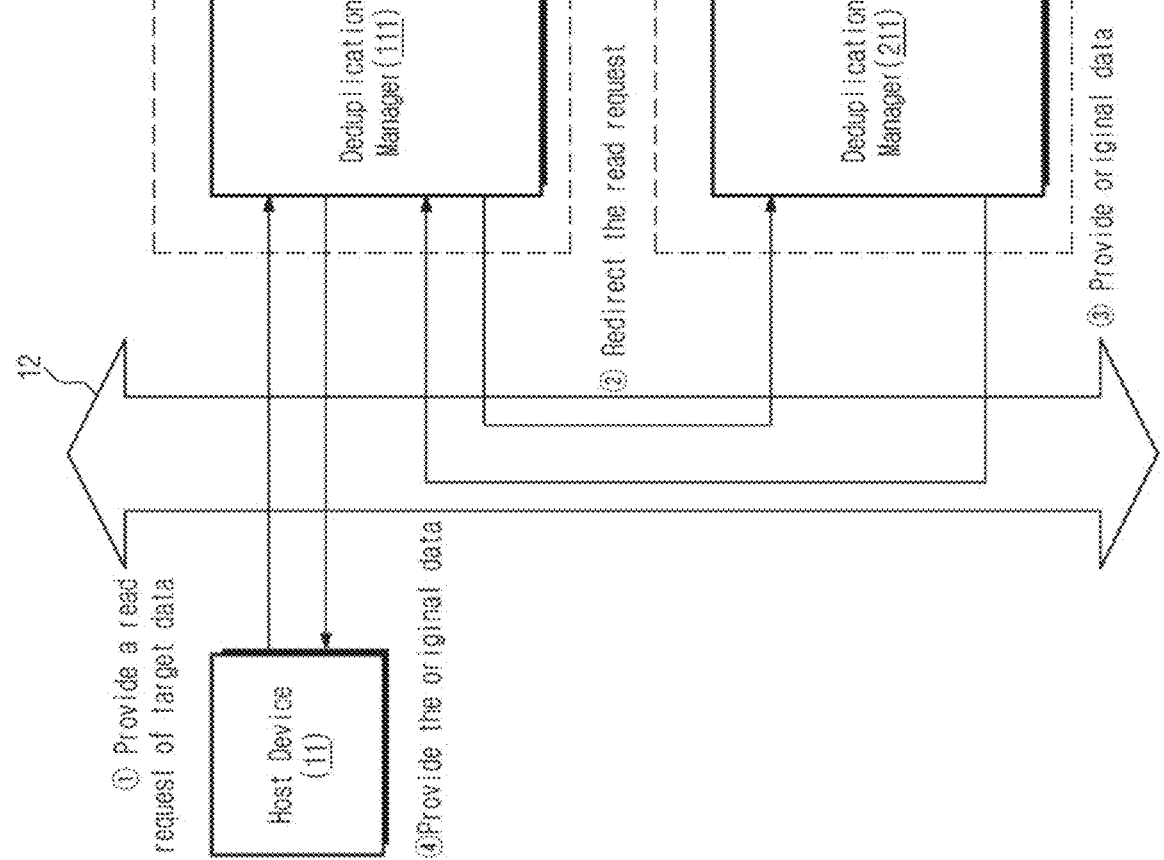

FIG. 11B is a diagram describing a read operation of a storage system according to some example embodiments of the present disclosure. A relay-based read operation according to some example embodiments of the present disclosure will be described with reference to FIG. 11B. The storage system 10 may include the host device 11, the PCIe bus 12, the first storage device 100, and the second storage device 200. The first storage device 100 may include the deduplication manager 111, the mapping table 112, and the non-volatile memory device 120. The second storage device 200 may include the deduplication manager 211, the mapping table 212, and the non-volatile memory device 220.

Below, a relay-based read operation of the storage system 10 according to some example embodiments of the present disclosure will be described.

In a first operation ①, the host device 11 may provide a read request for target data to the first storage device 100 through the PCIe bus 12. The target data may be target data targeted for deduplication. That is, the first storage device 100 may store only mapping information of the target data without storing the target data itself.

In a second operation ②, the deduplication manager 111 may redirect the read request corresponding to the first operation ① to the second storage device 200. For example, the deduplication manager 111 may check that the target data are duplicate data referring to original data of the second storage device 200 with reference to the mapping information of the target data in the mapping table 112. The deduplication manager 111 may redirect the read request to the second storage device 200 based on the checked mapping information.

In a third operation ③, the deduplication manager 211 may provide the original data to the deduplication manager 111 through the PCIe bus 12, based on the read request redirected through the second operation ②. The original data may be data that are referenced by the target data and include the same content as the target data.

In a fourth operation ④, the deduplication manager 111 may provide the original data received through the third operation ③ to the host device 11 through the PCIe bus 12. That is, the deduplication manager 111 may be provided with the original data from the deduplication manager 211 and may retransmit the original data to the host device 11.

Figure 12:
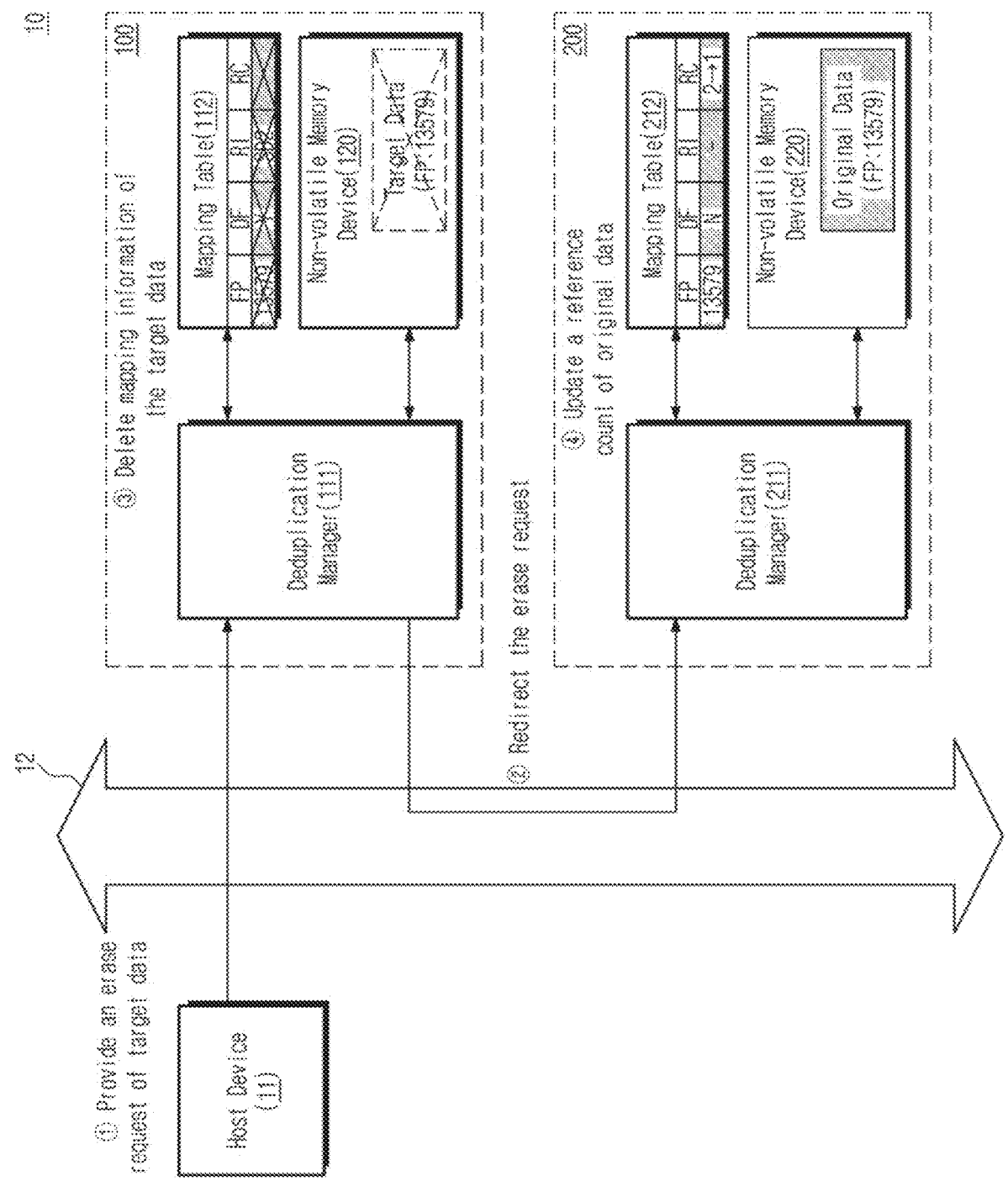
FIG. 12 is a diagram describing an erase operation of a storage system according to some example embodiments of the present disclosure.

FIG. 12 is a diagram describing an erase operation of a storage system according to some example embodiments of the present disclosure. An erase operation according to some example embodiments of the present disclosure will be described with reference to FIG. 12. The storage system 10 may include the host device 11, the PCIe bus 12, the first storage device 100, and the second storage device 200. The first storage device 100 may include the deduplication manager 111, the mapping table 112, and the non-volatile memory device 120. The second storage device 200 may include the deduplication manager 211, the mapping table 212, and the non-volatile memory device 220.

Below, an erase operation of the storage system 10 according to some example embodiments of the present disclosure will be described.

In a first operation ①, the host device 11 may provide an erase request for target data to the first storage device 100 through the PCIe bus 12. The target data may be target data targeted for deduplication. That is, the first storage device 100 may store only mapping information of the target data without storing the target data itself.

In a second operation ②, the deduplication manager 111 may redirect the erase request received through the first operation ① to the second storage device 200. For example, the deduplication manager 111 may check that the target data are duplicate data referring to original data of the second storage device 200 with reference to the mapping information of the target data in the mapping table 112. The deduplication manager 111 may redirect the erase request to the second storage device 200 based on the checked mapping information.

In a third operation ③, the deduplication manager 111 may delete (or, for example, may unmap) mapping information of the target data included in the mapping table 112, based on the erase request received through the first operation ①.

In a fourth operation ④, the deduplication manager 211 may update a reference count of original data in the mapping table 212, based on the redirected erase request through the second operation ②. For example, the deduplication manager 211 may decrease the reference count of the original data in the mapping table 212 from "2" to "1", based on the redirected erase request. In some example embodiments, because the updated reference count is not "0", the original data stored in the non-volatile memory device 220 may be maintained.

Figure 13:
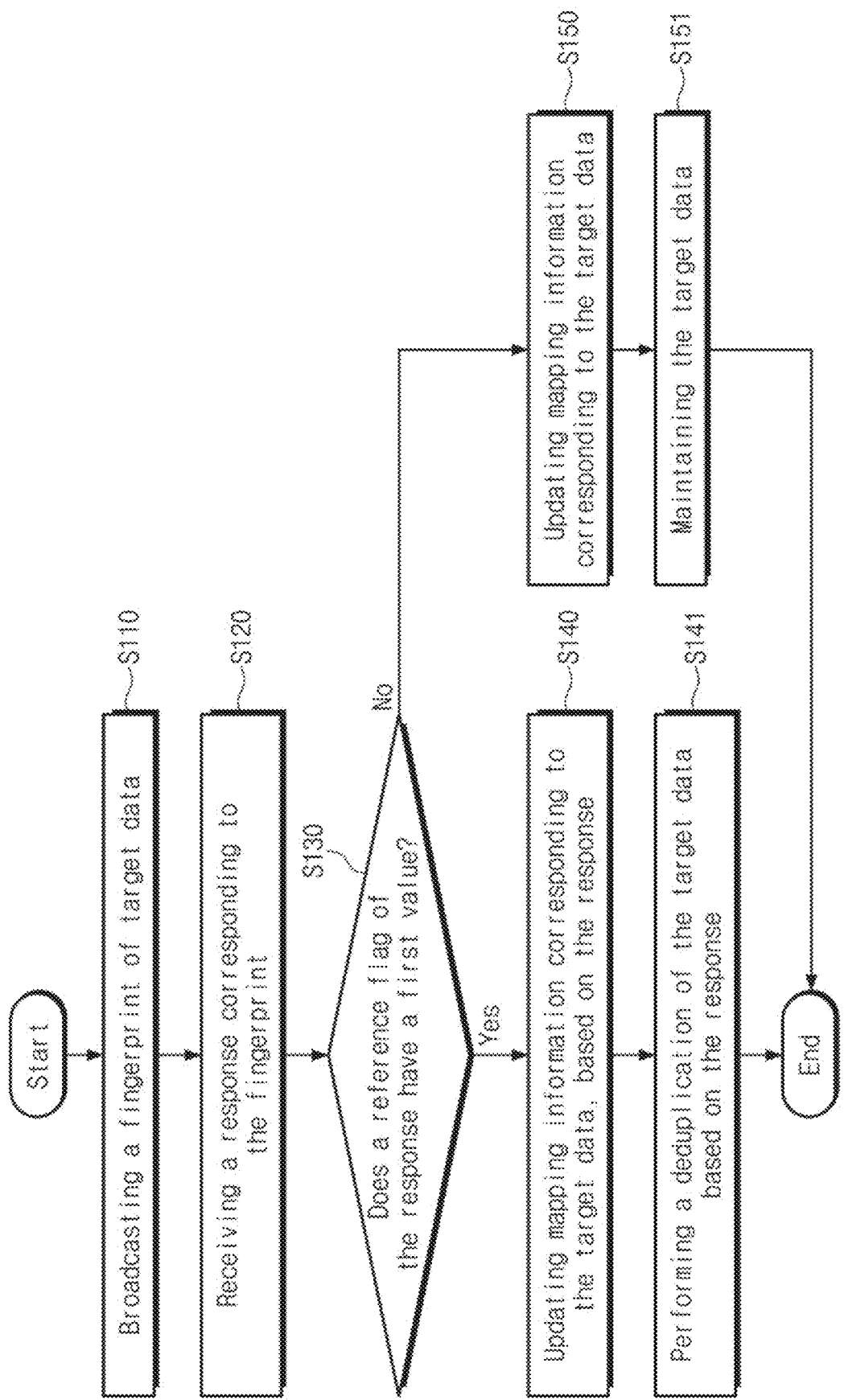
FIG. 13 is a flowchart describing a method of operating a storage device according to some example embodiments of the present disclosure.

FIG. 13 is a flowchart describing a method of operating a storage device according to some example embodiments of the present disclosure. A method of operating a storage device will be described with reference to FIG. 13. The storage device may communicate with an external storage device. The storage device may include a deduplication manager.

In operation S110, the deduplication manager of the storage device may broadcast a fingerprint of target data. In some example embodiments, the storage device may broadcast the fingerprint to the external storage device through a PCIe bus.

In operation S120, the deduplication manager of the storage device may receive a response corresponding to the fingerprint. In some example embodiments, the storage device may communicate with a plurality of external storage devices. In some example embodiments, in operation S120, the storage device may receive a plurality of responses corresponding to the fingerprint from the plurality of external storage devices.

In operation S130, the deduplication manager of the storage device may determine whether a reference flag of the response received in operation S120 has a first value. The reference flag may indicate whether original data corresponding to the fingerprint exist. When the reference flag has the first value, the original data may be present in the external storage device. When the reference flag has a second value, the original data may be absent from the external storage device. When the reference flag of the response has the first value, the storage device may perform operation S140. When the reference flag of the response does not have the first value, the storage device may perform operation S150.

In some example embodiments, the storage device may communicate with a plurality of external storage devices. In some example embodiments, in operation S130, the storage device may determine whether a response including the reference flag having the first value is present in a plurality of responses received from the plurality of external storage devices. When a response including the reference flag having the first value is present in the plurality of responses, the storage device may perform operation S140. When a response including the reference flag having the first value is absent from the plurality of responses, the storage device may perform operation S150.

In operation S140, the storage device may update mapping information of the target data based on the response received in operation S120. For example, a value of a duplicate flag in the mapping information of the target data may be set to the first value. A value of a reference index in the mapping information of the target data may be set to indicate identification information corresponding to the external storage device. That is, the storage device may manage the target data as duplicate data.

In operation S141, the storage device may perform deduplication of the target data based on the response received in operation S120.

In operation S150, the storage device may update the mapping information of the target data. For example, a value of the duplicate flag in the mapping information of the target data may be set to the second value. That is, the storage device may manage the target data as original data.

In operation S151, the storage device may maintain the target data. That is, as the target data are determined to be original data, the storage device may not perform the deduplication of the target data.

FIG. 14 is a flowchart describing a method of operating a storage system according to some example embodiments of the present disclosure. An operation method of a storage system will be described with reference to FIG. 14. The storage system may include the first storage device 100, the second storage device 200, and the third storage device 300.

In operation S210, the first storage device 100 may broadcast the fingerprint FP of target data. For example, the first to third storage devices 100 to 300 may be connected with each other through the PCIe bus. The first storage device 100 may broadcast the fingerprint FP of the target data to the second and third storage devices 200 and 300 through the PCIe bus.

In operation S220, the second storage device 200 may provide the first response RP1 including the reference flag RF having the second value "N" to the first storage device 100.

In operation S221, the first storage device 100 may determine that the second storage device 200 does not include original data, based on the first response RP1 received in operation S220.

In operation S230, the third storage device 300 may provide the second response RP2 including the reference flag RF having the first value "Y" to the first storage device 100.

In operation S231, the first storage device 100 may determine that the third storage device 300 includes original data, based on the second response RP2 received in operation S230.

In operation S240, the first storage device 100 may update mapping information corresponding to the target data, based on the second response RP2 received in operation S230. For example, a value of a duplicate flag in the mapping information of the target data may be set to the first value "Y". A value of a reference index in the mapping information of the target data may be set to indicate identification information corresponding to the third storage device 300. That is, the first storage device 100 may manage the target data as duplicate data.

In operation S241, the first storage device 100 may perform deduplication of the target data.

According to example embodiments of the present disclosure, a storage device including a deduplication manager, a method of operating the same, and a method of operating a storage system including the same are provided.

Also, a storage device that performs deduplication through the P2P-based communication with an external storage device such that the input/output (I/O) load between the storage device and a host device decreases, a computational load of the host device decreases, a data processing speed is improved, and a storage capacity is efficiently used, a method of operating the same, and a method of operating a storage system including the same are provided.

The storage system 10 (or other circuitry, for example, the host device 11, storage devices 100, etc., storage controllers 110, etc., deduplication managers 111, etc., processor 113, rom 115, ECC engine 116, host interface circuit 117, mapping table 112, non-volatile memory interface circuit 118, voltage generator 122, row decoder 123, page buffer unit 125, control logic 121, column decoder 126, i/o circuit 127, fingerprint generator, or other circuitry discussed herein) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. A method of operating a storage device which communicates with a first external storage device and the storage device includes a first deduplication manager, the method comprising:
   broadcasting, by the deduplication manager, a first fingerprint of first data;
   receiving a first response corresponding to the first fingerprint from a second deduplication manager of the first external storage device through a communication bus in a peer-to-peer manner, the first deduplication manager receiving the first response from the second deduplication manager without intervention of a host device;
   determining, by the first deduplication manager, whether a reference flag of the first response has a first value or a second value;
   updating, by the first deduplication manager, based on a determination that the reference flag of the first response has the first value, first mapping information of a mapping table based on the first response, the first mapping information corresponding to the first data; and
   performing, by the first deduplication manager, based on a determination that the reference flag of the first response has the first value, deduplication of the first data based on the first response.

2. The method of claim 1, wherein
   the storage device communicates with the first external storage device through a peripheral component interconnect express (PCIe) bus, and
   the receiving of the first response corresponding to the first fingerprint from the second duplication manager includes receiving the first response from the second deduplication manager through the PCIe bus directly to the first deduplication manager.

3. The method of claim 1, further comprising:
   updating, by the first deduplication manager, based on a determination that the reference flag of the first response has the second value, the first mapping information of the mapping table; and maintaining, by the first deduplication manager, based on a determination that the reference flag of the first response has the second value, the first data.

4. The method of claim 1, wherein the first response includes:
a first field including identification information of the first external storage device;
a second field including the first fingerprint broadcast by the storage device;
a third field including the reference flag having the first value based on first original data having the first fingerprint being present in the first external storage device and the second value based on the first original data having the first fingerprint being absent from the first external storage device;
a fourth field including a logical address of the first original data based on the reference flag having the first value; and
a fifth field including a physical address of the first original data based on the reference flag having the first value.

5. The method of claim 1, wherein
the storage device stores a plurality of data including the first data,
the mapping table manages a plurality of mapping information respectively corresponding to the plurality of data,
the plurality of mapping information include the first mapping information, and
the first mapping information includes:
a logical address of the first data;
a physical address of the first data;
the first fingerprint of the first data;
a duplicate flag having a third value based on the first data being deduplicated and a fourth value based on the first data being not deduplicated;
a reference index including identification information of a storage device, in which there are stored first original data to which the first data refer, based on the duplicate flag having the third value; and
a reference count including a number of times that the first data are referenced, based on the duplicate flag having the fourth value.

6. The method of claim 1, wherein
the storage device further communicates with a host device, and
the broadcasting of the first fingerprint of the first data by the first deduplication manager includes:
receiving a deduplication request of the first data from the host device; and
broadcasting, by the first deduplication manager, the first fingerprint of the first data based on the deduplication request.

7. The method of claim 1, wherein the broadcasting of the first fingerprint of the first data by the first deduplication manager includes:
during an idle state, determining, by the first deduplication manager, whether a size of write data stored in a write buffer memory exceeds a write threshold value; and
broadcasting, by the first deduplication manager, based on a determination that the size of the write data stored in the write buffer memory exceeds the write threshold value, the first fingerprint of the first data.

8. The method of claim 1, wherein
the storage device further communicates with a host device, and
the broadcasting of the first fingerprint of the first data by the first deduplication manager includes:
receiving the first fingerprint of the first data from the host device; and
broadcasting, by the first deduplication manager, the first fingerprint of the first data based on the first fingerprint thus received.

9. The method of claim 1, wherein
the storage device further includes a fingerprint generator, and
the broadcasting of the first fingerprint of the first data by the first deduplication manager includes:
sampling, by the fingerprint generator, some of a set of plural bits corresponding to the first data;
generating, by the fingerprint generator, the first fingerprint of the first data by applying the sampled bits to a hashing function; and
broadcasting, by the first deduplication manager, the first fingerprint of the first data based on the first fingerprint thus generated.

10. The method of claim 1, wherein
the storage device further communicates with a host device,
the reference flag of the first response has the first value, and
the method further comprises:
after the first mapping information is updated and the first data are deduplicated, receiving a read request for the first data from the host device; and
redirecting, by the first deduplication manager, the read request to the first external storage device, based on the updated first mapping information of the mapping table.

11. The method of claim 1, wherein
the storage device further communicates with a host device,
the reference flag of the first response has the first value, and
the method further comprises:
after the first mapping information is updated and the first data are deduplicated, receiving an erase request for the first data from the host device;
redirecting, by the first deduplication manager, the erase request to the first external storage device, based on the updated first mapping information of the mapping table; and
deleting, by the first deduplication manager, the updated first mapping information in the mapping table.

12. The method of claim 1, further comprising:
receiving a second fingerprint of second data broadcast from the second deduplication manager of the first external storage device; and
providing, by the first deduplication manager, a second response corresponding to the second fingerprint to the first external storage device with reference to the mapping table.

13. The method of claim 12, wherein the providing of the second response corresponding to the second fingerprint to the first external storage device with reference to the mapping table by the deduplication manager includes:
determining, by the first deduplication manager, whether second mapping information including the second fingerprint is present in the mapping table;

providing, by the first deduplication manager, based on a determination that the second mapping information including the second fingerprint is present in the mapping table, the second response including the reference flag having the first value to the first external storage device; and providing, by the first deduplication manager, based on a determination that the second mapping information including the second fingerprint is absent from the mapping table, the second response including the reference flag having the second value to the first external storage device.

14. The method of claim 13, wherein the providing of the second response including the reference flag having the first value to the first external storage device by the first deduplication manager based on a determination that the second mapping information including the second fingerprint is present in the mapping table includes:

increasing, by the first deduplication manager, a reference count of the second mapping information in the mapping table.

15. The method of claim 1, wherein
the storage device further communicates with a second external storage device, and
the method further comprises:
receiving a third response corresponding to the first fingerprint from the second external storage device;
determining, by the first deduplication manager, whether a reference flag of the third response has the first value or the second value;
updating, by the first deduplication manager, based on a determination that the reference flag of the third response has the first value, the first mapping information of the mapping table based on the third response;
performing, by the first deduplication manager, based on a determination that the reference flag of the third response has the first value, deduplication of the first data based on the third response;
updating, by the first deduplication manager, based on a determination that both the reference flag of the first response and the reference flag of the third response have the second value, the first mapping information of the mapping table; and
maintaining, by the first deduplication manager, based on a determination that both the reference flag of the first response and the reference flag of the third response have the second value, the first data.

16. A method of operating a storage system which includes a first storage device including a first deduplication manager and a second storage device including a second deduplication manager, the method comprising:
broadcasting, by the first deduplication manager, a fingerprint of target data;
providing, by the second deduplication manager, a first response corresponding to the broadcast fingerprint to the first storage device through a communication bus in a peer-to-peer manner, the first deduplication manager of the first storage device receiving the first response from the second deduplication manager without intervention of a host device;
determining, by the first deduplication manager, whether a reference flag of the first response has a first value or a second value;
updating, by the first deduplication manager, based on a determination that the reference flag of the first response has the first value, mapping information corresponding to the target data and included in a mapping table of the first storage device, based on the first response; and
performing, by the first deduplication manager, based on a determination that the reference flag of the first response has the first value, deduplication of the target data in the first storage device, based on the first response.

17. The method of claim 16, wherein
the storage system further includes a third storage device including a third deduplication manager, and
the method further comprises:
providing, by the third deduplication manager, a second response corresponding to the broadcast fingerprint to the first storage device;
determining, by the first deduplication manager, whether a reference flag of the second response has the first value or the second value;
updating, by the first deduplication manager, based on a determination that the reference flag of the second response has the first value, the mapping information corresponding to the target data and included in the mapping table of the first storage device, based on the second response;
performing, by the first deduplication manager, based on a determination that the reference flag of the second response has the first value, deduplication of the target data in the first storage device, based on the second response;
updating, by the first deduplication manager, based on a determination that both the reference flag of the first response and the reference flag of the second response have the second value, the mapping information corresponding to the target data and included in the mapping table of the first storage device; and
maintaining, by the first deduplication manager, based on a determination that both the reference flag of the first response and the reference flag of the second response have the second value, the first data in the first storage device.

18. A storage device comprising:
a memory device configured to store a plurality of data;
a mapping table configured to manage a plurality of mapping information respectively corresponding to the plurality of data; and
a first deduplication manager configured to communicate with an external storage device, the first deduplication manager being configured to:
broadcast a first fingerprint of first data among the plurality of data;
receive a first response corresponding to the first fingerprint from an external deduplication manager of the external storage device through a communication bus in a peer-to-peer manner, the first deduplication manager receiving the first response from the external deduplication manager without intervention of a host device;
determine whether a reference flag of the first response has a first value or a second value;
perform deduplication of the first data among the plurality of data in the memory device, based on the first response based on a determination that the reference flag of the first response has the first value, update first mapping information corresponding to the first data from among the plurality of mapping information of the mapping table; and update the first mapping information among the plurality of mapping information of the mapping table and maintain the first data among the plurality of data in the memory device based on a determination that the reference flag of the first response has the second value.

19. The storage device of claim 18, wherein
the external storage device includes second data having a second fingerprint, and
the first deduplication manager is further configured to:
receive the second fingerprint broadcast from the external deduplication manager of the external storage device;
determine whether second mapping information including the second fingerprint from among the plurality of mapping information is present in the mapping table;
provide a second response including a reference flag having the first value to the external storage device and increase a reference count of the second mapping information in the mapping table based on a determination that the second mapping information including the second fingerprint is present in the mapping table; and
provide the second response including the reference flag having the second value to the external storage device based on a determination that the second mapping information including the second fingerprint is absent from the mapping table.

20. The storage device of claim 18, further comprising:
a fingerprint generator configured to:
sample some of a set of plural bits corresponding to the first data;
generate the first fingerprint based on applying the sampled bits to a hashing function; and
provide the first fingerprint to the deduplication manager.

\* \* \* \* \*